(12) United States Patent
Kato

(10) Patent No.: US 10,196,795 B2
(45) Date of Patent: Feb. 5, 2019

(54) WORK VEHICLE

(71) Applicant: KOMATSU LTD., Tokyo (JP)

(72) Inventor: Yasunari Kato, Komatsu (JP)

(73) Assignee: KOMATSU LTD., Tokyo (JP)

( * ) Notice: Subject to any disclaimer, the term of this patent is extended or adjusted under 35 U.S.C. 154(b) by 28 days.

(21) Appl. No.: 15/516,743

(22) PCT Filed: Oct. 21, 2016

(86) PCT No.: PCT/JP2016/081339
§ 371 (c)(1),
(2) Date: Apr. 4, 2017

(87) PCT Pub. No.: WO2017/051932
PCT Pub. Date: Mar. 30, 2017

(65) Prior Publication Data
US 2018/0112372 A1 Apr. 26, 2018

(51) Int. Cl.
*B60R 7/04* (2006.01)
*E02F 3/36* (2006.01)
(Continued)

(52) U.S. Cl.
CPC .............. *E02F 3/3668* (2013.01); *B60R 7/04* (2013.01); *E02F 3/3663* (2013.01); *E02F 9/125* (2013.01);
(Continued)

(58) Field of Classification Search
CPC ......... E02F 3/3668; E02F 3/3663; B60R 7/04
(Continued)

(56) References Cited

U.S. PATENT DOCUMENTS 5,571,226 A 11/1996 Kobayashi
5,617,929 A * 4/1997 Richardson ............ B60K 20/02
180/326
(Continued)

FOREIGN PATENT DOCUMENTS

CN 1109950 A 10/1995
CN 2820967 Y 9/2006
(Continued)

OTHER PUBLICATIONS

The Extended European Search Report for the corresponding European application No. 16848720.5, dated Apr. 19, 2018.
(Continued)

*Primary Examiner* — Faye M Fleming
(74) *Attorney, Agent, or Firm* — Global IP Counselors, LLP

(57) ABSTRACT

A wheel loader includes a console box, a link rod, and a shutoff valve. The console box is disposed on the side of an operator's seat, is able to rotate in the forward and backward direction between an operation position in which the console box is disposed horizontally and a retracted position in which the console box is rotated rearward from the operation position, and has a slot. The link rod is connected at one end to the slot and transmits the rotation of the console box. The link rod is able to rotate a shaft to switch between an open position in which an actuator drive-use hydraulic circuit can be actuated, and a closed position in which the actuator drive-use hydraulic circuit cannot be actuated. A second end of the link rod is linked to the shaft.

13 Claims, 27 Drawing Sheets

(51) Int. Cl.
*E02F 9/20* (2006.01)
*G05G 9/047* (2006.01)
*E02F 9/12* (2006.01)
*E02F 9/16* (2006.01)
*E02F 3/02* (2006.01)
*E02F 3/627* (2006.01)

(52) U.S. Cl.
CPC .............. *E02F 9/163* (2013.01); *E02F 9/20* (2013.01); *E02F 9/2004* (2013.01); *G05G 9/047* (2013.01); *E02F 3/02* (2013.01); *E02F 3/627* (2013.01); *E02F 9/166* (2013.01)

(58) Field of Classification Search
USPC .......................................................... 180/326
See application file for complete search history.

(56) References Cited

U.S. PATENT DOCUMENTS

| | | | | |
|---|---|---|---|---|
| 5,924,515 | A | * | 7/1999 | Stauffer .................. B60N 2/38 180/326 |
| 6,352,133 | B1 | * | 3/2002 | Ojima ...................... E02F 9/16 180/326 |
| 7,455,494 | B2 | | 11/2008 | Krieger |
| 2004/0154427 | A1 | | 8/2004 | Jo et al. |
| 2010/0186533 | A1 | | 7/2010 | Akahane et al. |
| 2015/0032337 | A1 | | 1/2015 | Nakamura et al. |
| 2018/0058037 | A1 | * | 3/2018 | Muramoto ................ E02F 9/16 |
| 2018/0112374 | A1 | * | 4/2018 | Kato ...................... E02F 9/0841 |

FOREIGN PATENT DOCUMENTS

| | | |
|---|---|---|
| CN | 101379248 A | 3/2009 |
| CN | 104080667 A | 10/2014 |
| CN | 104204365 A | 12/2014 |
| EP | 2 204 505 A1 | 7/2010 |
| EP | 2 574 699 A1 | 4/2013 |
| FR | 2 816 727 A1 | 5/2002 |
| JP | 8-137567 A | 5/1996 |
| JP | 2008-25141 A | 2/2008 |
| JP | 2009-263985 A | 11/2009 |
| JP | 4550605 B2 | 9/2010 |

OTHER PUBLICATIONS

The Chinese Office Action for the corresponding Chinese application No. 201680003098.3, dated Jan. 19, 2018.

The International Search Report for the corresponding international application No. PCT/JP2016/081339, dated Dec. 27, 2016.

* cited by examiner

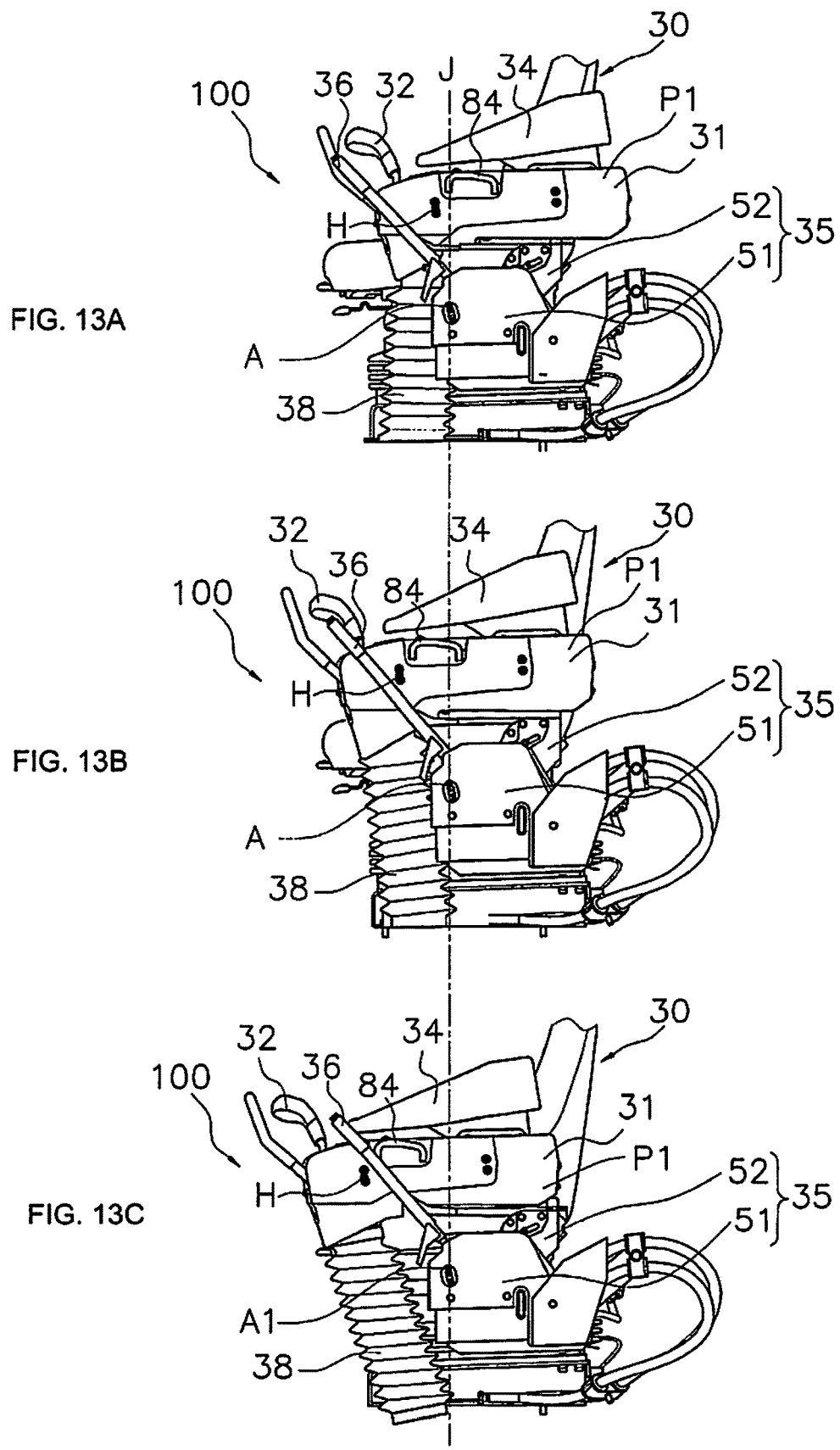

WORK VEHICLE

CROSS-REFERENCE TO RELATED APPLICATIONS

This application is a U.S. National stage application of International Application No. PCT/JP2016/081339, filed on Oct. 21, 2016.

BACKGROUND

Field of the Invention

The present invention relates to a work vehicle.

Description of the Related Art

A configuration of a wheel loader, a hydraulic excavator, or another such work vehicle has been disclosed in which an actuator locking device is provided so that operation becomes impossible when the operator has left the operator's seat (see Japanese Patent No. 4,550,605, for example).

With the device disclosed in Japanese Patent No. 4,550,605, a lock lever is provided, and the actuator is locked by rotating the lock lever when the operator leaves his seat.

Meanwhile, a console box is disposed to the side of the operator's seat in the above-mentioned work vehicle, and an operation lever is provided to the console box. When there is limited space in the cab in which the operator's seat is provided, the configuration is such that the console box can be rotated forward and backward so that the operator can more easily leave his seat.

SUMMARY

With a conventional configuration, however, when the operator leaves the operator's seat, the lock lever has to be rotated after the console box has been rotated to the rear, which entails extra work.

In light of the above problem encountered in the past, it is an object of the present invention to provide a work vehicle that entails less work to leave the seat.

In order to achieve the stated object, the work vehicle pertaining to the first exemplary embodiment of the present invention comprises a console box, a link rod, and a shutoff valve. The console box is disposed on the side of an operator's seat, is able to rotate in the forward and backward direction between an operation position in which the console box is disposed horizontally and a retracted position in which the console box is rotated rearward from the operation position, and has a slot. The link rod is connected at one end to the slot and transmits the rotation of the console box. The shutoff valve is capable of rotating an opening and closing shaft to switch between an open position at which an actuator drive-use hydraulic circuit can be actuated, and a closed position at which the actuator drive-use hydraulic circuit cannot be actuated. The other end of the link rod is linked to the opening and closing shaft.

Here, as the console box rotates to the rear, the fluid that controls the hydraulic actuator is blocked, which locks the hydraulic actuator.

Thus, enough space for leaving the seat can be ensured by rotating the console box to the rear, and the hydraulic actuator can be locked, with both of these being accomplished with a single operation, so less work is entailed when the operator leaves his seat.

As the console box rotates, the link rod slides along the slot, rotating the opening and closing shaft and putting the shutoff valve in its closed position. Thus, the shutoff valve is put in a blocked state when the console box is rotated by a mechanical link, so the locking of the hydraulic actuator is accomplished easily.

The work vehicle pertaining to a second exemplary embodiment of the present invention is the work vehicle pertaining to the first exemplary embodiment of the present invention, further comprising a lever member. The lever member is attached to the opening and closing shaft. The other end of the link rod is rotatably connected to the lever member.

Consequently, as the console box rotates, the link rod slides through the slot, and the lever member is rotated and rotates the rotary shaft, putting the shutoff valve in the closed position.

While the link rod is sliding through the slot, the lever member is not pushed, and when the first end is disposed at the end of the slot, the link rod pushes the lever member along with the rotation of the console box. Thus, even when the console box is rotated, the lever member does not move while the link rod is moving through the slot, and the range over which the lever member rotates in the rotational range of the console box is narrowed. In other words, the rotation of the console box and the rotation of the lever member do not correspond on a one-to-one basis. Therefore, the shutoff valve spends as little time as possible between the blocked state and the opened state, switching between the two states can be carried out quickly, and the locked and unlocked states of the hydraulic actuator can be clearly distinguished.

The work vehicle pertaining to a third exemplary embodiment of the present invention is the work vehicle pertaining to the first or second exemplary embodiments of the present invention, wherein the slot is formed in a linear shape.

Thus forming the slot in a linear shape results in less wear than when the slot has a curved shape.

The work vehicle pertaining to a fourth exemplary embodiment of the present invention is the work vehicle pertaining to the second or third exemplary embodiments of the present invention, further comprising a spring member. The spring member links the lever member to the floor of the operator's seat. A first end of the spring member linked to the lever member is disposed more to the rear than the opening and closing shaft of the lever member. A second end of the spring member linked to the floor is disposed more to the front than the opening and closing shaft. The opening and closing shaft is disposed, in side view, within the rotational range of the spring member whose fulcrum is the second end as the lever member rotates.

The biasing force of this spring member allows the first end of the link rod to move rapidly within the slot. Also, the lever member is biased to the open side until the spring member rotates from the front and goes past the opening and closing shaft, and the lever member is biased to the blocked side once the spring member has passed the opening and closing.

Therefore, the shutoff valve spends as little time as possible between the blocked state and the opened state, switching between the two states can be carried out quickly, and the locked and unlocked states of the hydraulic actuator can be clearly distinguished.

The above-mentioned "second end of the spring member linked to the floor" encompasses a situation in which the second end of the spring member is linked directly or indirectly to the floor.

The work vehicle pertaining to a fifth exemplary embodiment of the present invention is the work vehicle pertaining to the third exemplary embodiment of the present invention, wherein the shutoff valve is provided higher than the floor of the operator's seat.

Thus, providing the shutoff valve higher than the floor makes cab assembly easier than when the shutoff valve is provided lower than the floor.

The work vehicle pertaining to a sixth exemplary embodiment of the present invention is the work vehicle pertaining to the any of the first to fifth exemplary embodiments of the present invention, wherein the actuator drive-use hydraulic circuit has a hydraulic actuator, a steering control valve, a pilot valve, and a pilot pipe. The hydraulic actuator changes the steering angle of the work vehicle. The steering control valve supplies hydraulic fluid to the hydraulic actuator. The pilot valve supplies pilot fluid to the steering control valve. The pilot pipe connects the steering control valve to the pilot valve. The shutoff valve is installed along the pilot pipe.

Thus blocking off the pilot fluid causes the steering control valve not to operate, so the hydraulic actuator is not driven and the steering is locked.

The present invention provides a work vehicle with which leaving the seat entails less work.

BRIEF DESCRIPTION OF DRAWINGS

FIGS. 13A to 13C are side views illustrating the center of gravity position in the operation position when the console box in FIG. 3 has been slid;

DETAILED DESCRIPTION OF EXEMPLARY EMBODIMENTS

The wheel loader of an exemplary embodiment pertaining to the present invention will now be described through reference to the drawings.

1. Configuration 1-1. Overview of Wheel Loader Configuration

Figure 1:
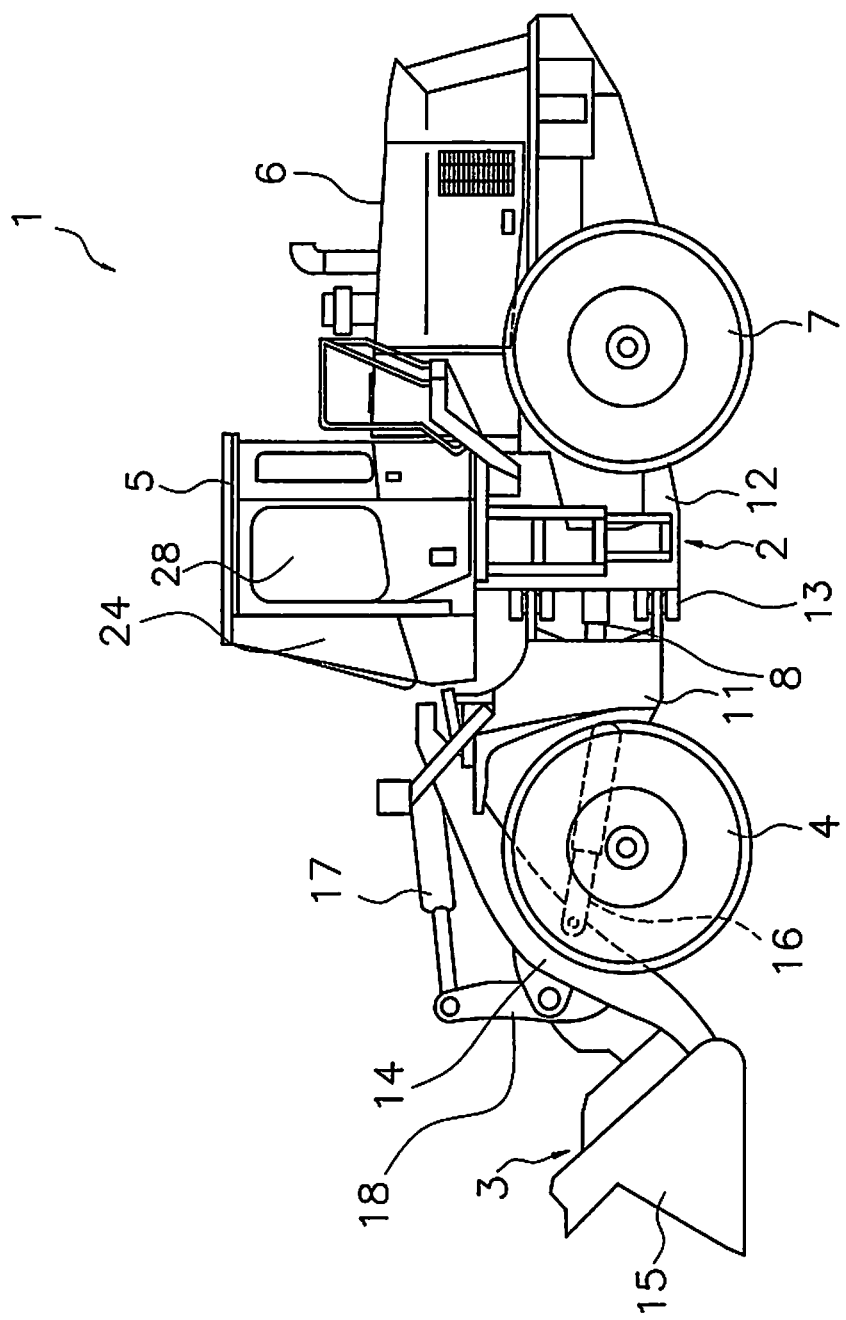
FIG. 1 is a side view of a wheel loader in an exemplary embodiment pertaining to the present invention.
Figure 21:
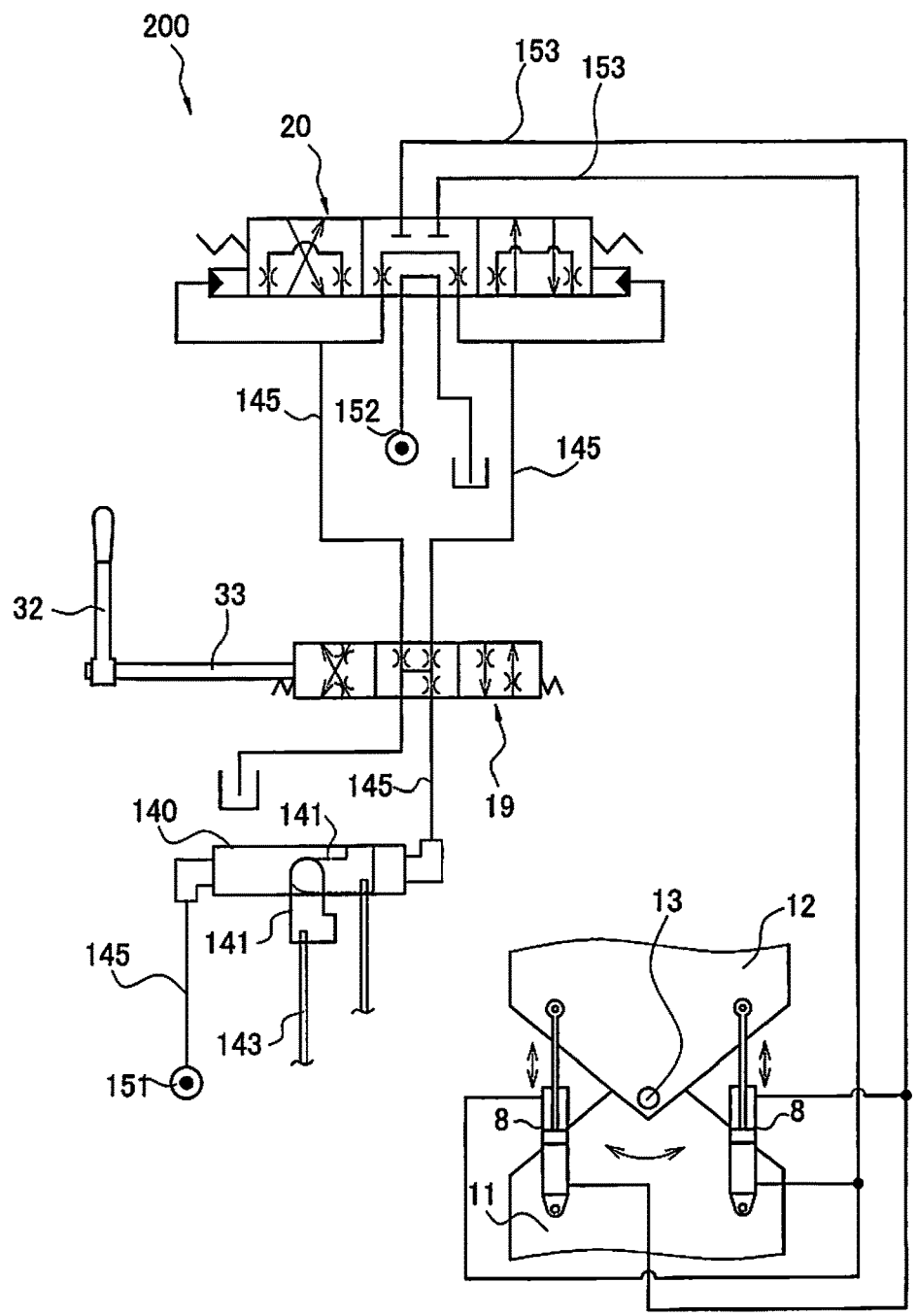
FIG. 21 is a diagram of the hydraulic circuit in which the shutoff valve of the steering lock mechanism in FIG. 19 is used.

FIG. 1 is a simplified view of the configuration of a wheel loader 1 in this exemplary embodiment. The wheel loader 1 in this exemplary embodiment mainly comprises a body frame 2, a work implement 3, a pair of front tires 4, a cab 5, an engine compartment 6, a pair of rear tires 7, and an actuator drive-use hydraulic circuit 200 (FIG. 21).

In this exemplary embodiment, the forward, rearward, left, and right directions refer to those directions as seen by an operator sitting in an operator's seat 30 (discussed below) inside the cab 5.

The wheel loader 1 uses the work implement 3 to perform work, such as scooping up soil.

The body frame 2 is an articulated type, and has a front frame 11, a rear frame 12, and a linking shaft 13. The front frame 11 is disposed ahead of the rear frame 12. The linking shaft 13 is provided in the middle in the vehicle width direction, and links the front frame 11 and the rear frame 12 so that the front frame 11 and the rear frame 12 can pivot with respect to each other. The front tires 4 are attached on the left and right sides of the front frame 11. The rear tires 7 are attached on the left and right sides of the rear frame 12.

The work implement 3 is driven by hydraulic fluid from a work implement pump (not shown). The work implement 3 has a boom 14, a bucket 15, a lift cylinder 16, and a bucket cylinder 17. The boom 14 is mounted to the front frame 11. The bucket 15 is attached to the distal end of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. The extension and retraction of the lift cylinder 16 causes the boom 14 to pivot up and down. One end of the bucket cylinder 17 is attached to the front frame 11, and the other end of the bucket cylinder 17 is attached to the bucket 15 via a bell crank 18. The extension and retraction of the bucket cylinder 17 causes the bucket 15 to pivot up and down.

The actuator drive-use hydraulic circuit 200 includes a pair of steering cylinders 8 as actuators. The steering cylinders 8 are disposed on the left and right sides in the vehicle width direction of the linking shaft 13, and are each attached to the front frame 11 and the rear frame 12. The amount of fluid supplied to the steering cylinders 8 is varied to change the steering angle of the front frame 11 with respect to the rear frame 12, and thereby change the travel direction of the wheel loader 1.

The cab 5 rests on top of the rear frame 12, and in its interior are disposed a steering wheel 37 or joystick 32 (see FIG. 2; discussed below) used for steering operation, levers for controlling the work implement 3, various kinds of display device, and so forth. The engine compartment 6 is disposed on the rear frame 12 and to the rear of the cab 5, and houses an engine.

1-2. Cab Configuration

Figure 2:
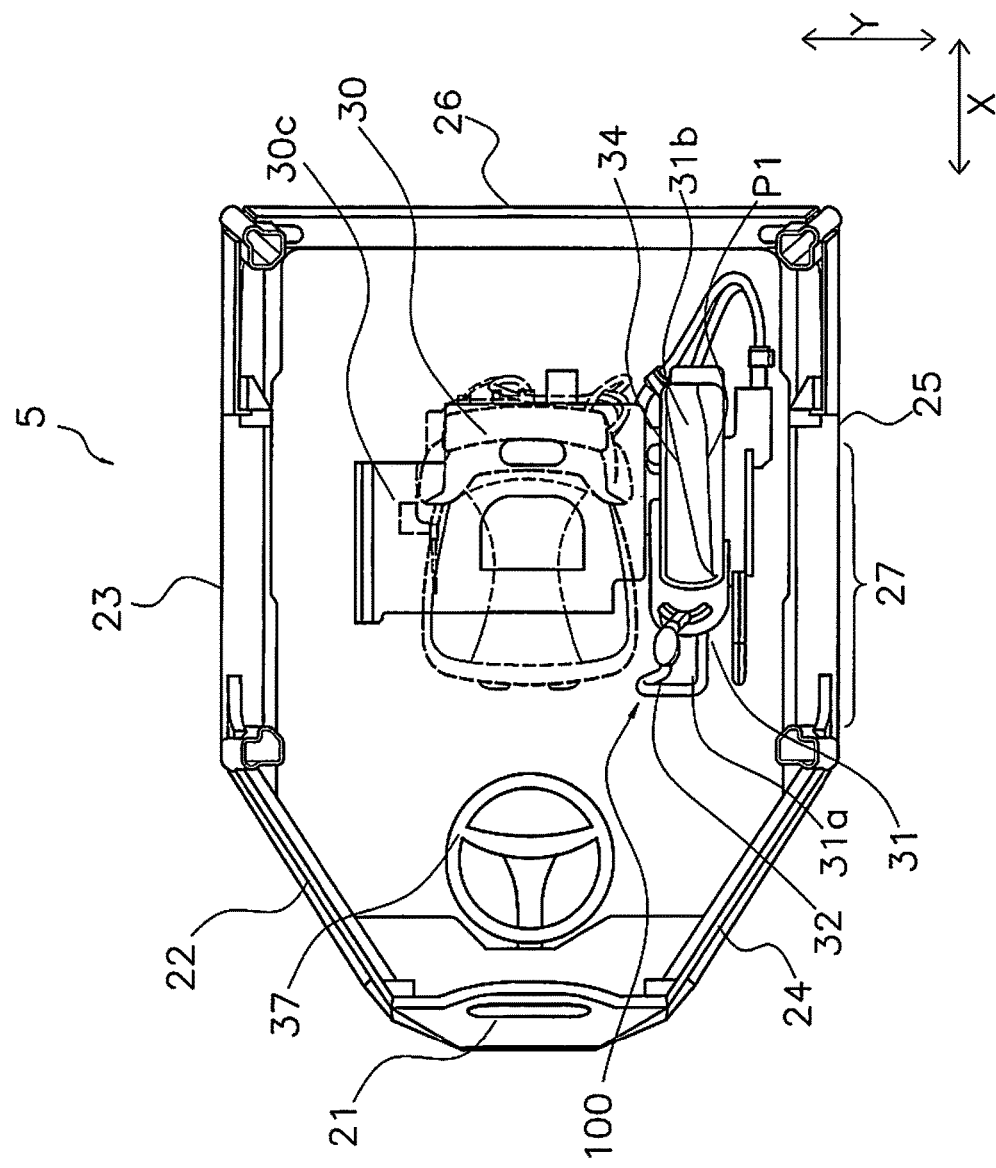
FIG. 2 is a top view of the configuration inside the cab in FIG. 1 in a state in which the console box is disposed in the operation position.
Figure 3:
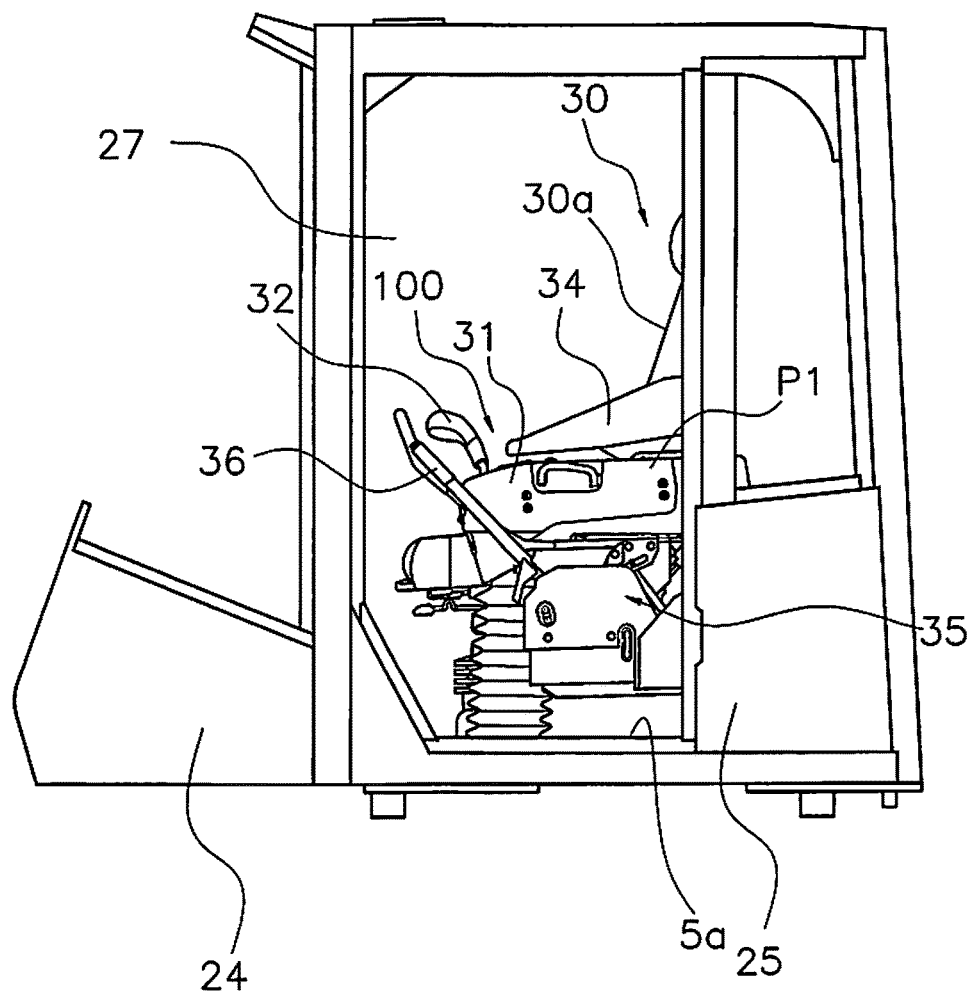
FIG. 3 is a left side view of the configuration of the cab in FIG. 1 in a state in which the console box is disposed in the operation position.

FIG. 2 is a top view of the cab 5. FIG. 3 is a partial side view of the cab 5. As shown in FIG. 2, in top view the cab 5 is substantially hexagonal, and has a front face 21, a right angled face 22, a right side face 23, a left angled face 24, a left side face 25, and a rear face 26. The front face 21 and the rear face 26 are parallel to each other, and are each disposed in the left and right direction (see the arrow Y in FIG. 2). The right side face 23 is disposed facing forward from the right end of the rear face 26. The right angled face 22 is disposed at an angle to the forward and backward direction (see the arrow X in FIG. 2), and is provided between the front end of the right side face 23 and the right end of the front face 21. The left side face 25 is disposed facing forward from the left end of the rear face 26. The left angled face 24 is at an angle to the forward and backward direction, and is provided between the front end of the left side face 25 and the left end of the front face 21. The right angled face 22 and the left angled face 24 are disposed such that the distance between them narrows moving forward. The right angled face 22 and the left angled face 24 are disposed at an angle to the forward and backward direction in order to avoid interference with the front frame during steering operations.

A door opening 27 is located at a position ahead of the left side face 25, and the door 28 shown in FIG. 1 is provided to this door opening 27.

1-3. Internal Configuration of Cab

Figure 4:
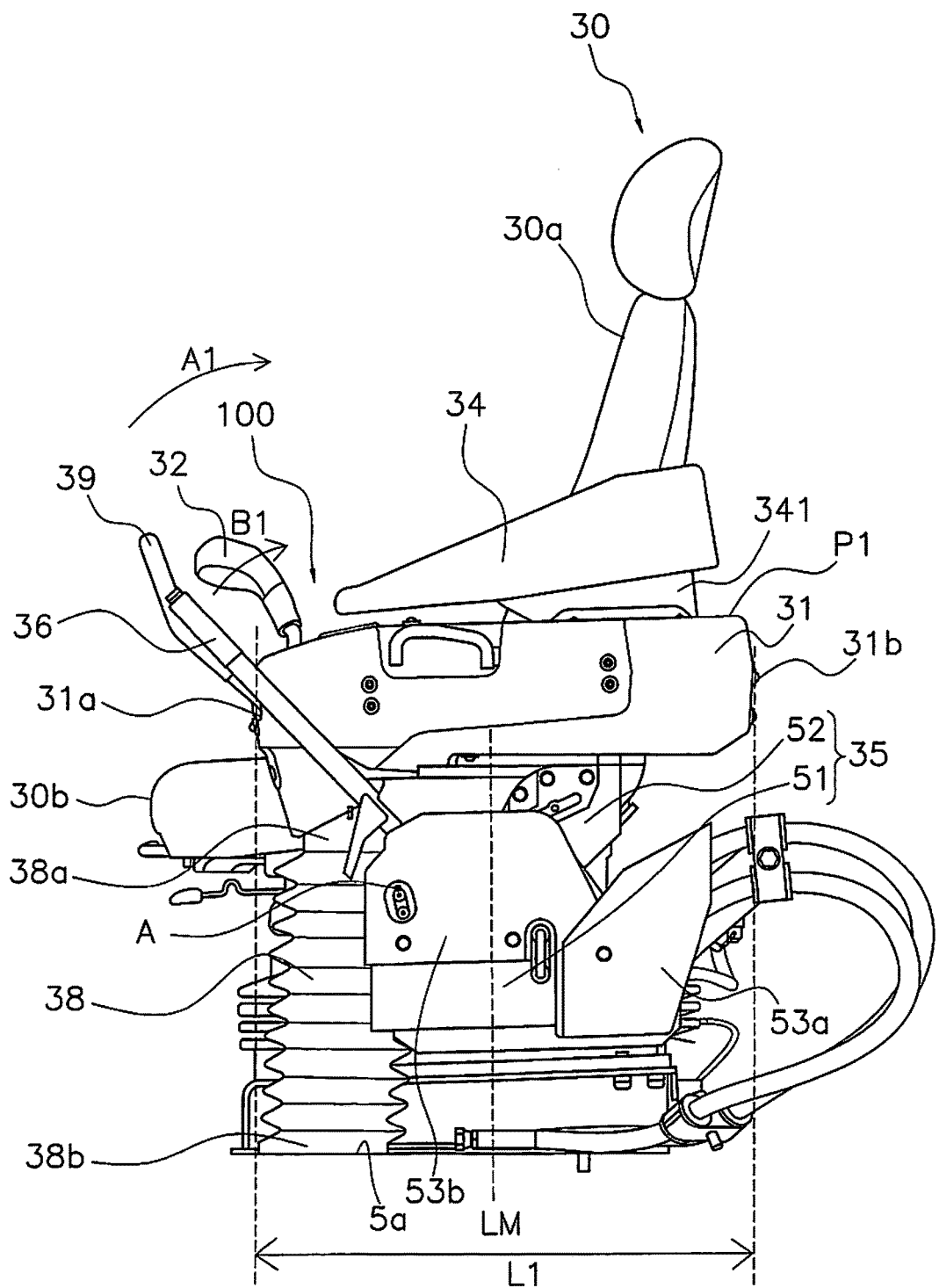
FIG. 4 is a side view of the operator's seat in FIG. 3 and of the console box assembly in a state in which the console box is disposed in the operation position.

FIG. 4 shows the state when the left side face 25 has been removed in FIG. 3.

The operator's seat 30, a console box assembly 100, the steering wheel 37 (see FIG. 2), and so forth are provided inside the cab 5. The console box assembly 100 is disposed on the left side of the operator's seat 30, has the joystick 32 and so forth, and is used by the operator to perform steering operations.

1-4. Operator's Seat, Steering Wheel

As shown in FIG. 2, the operator's seat 30 is disposed in the approximate center between the right side face 23 and the left side face 25. The operator's seat 30 is disposed at a position that is more or less opposite the door opening 27. As shown in FIG. 4, the operator's seat 30 has a backrest 30a, a seat bottom 30b, a lower frame 30c (see FIG. 7; discussed below) that is under the seat bottom 30b, and so on, and a spring (not shown) is disposed under the lower frame 30c.

The steering wheel 37 is used by the operator to change the steering angle of the front frame 11 with respect to the rear frame 12 during movement, etc. As shown in FIG. 2, the steering wheel 37 is disposed ahead of the operator's seat 30 and is disposed between the right angled face 22 and the left angled face 24.

1-5. Console Box Assembly

The console box assembly 100 has a joystick 32 that is used by the operator during steering operations, a console box 31 that supports the joystick 32, and so forth.

The console box assembly 100 has a console box 31 (see FIG. 4), a joystick 32 (see FIG. 4), a link 33 (see FIG. 5; discussed below), an armrest 34 (see FIG. 4), a support component 35 (see FIG. 4), a rotary lever 36 (see FIG. 4), a bellows 38 (see FIG. 4), a gas spring 110 (see FIG. 5; discussed below), an operation position stopper 111 (see FIG. 5; discussed below), a retracted position stopper 112 (see FIG. 18; discussed below), a steering lock mechanism 115 (see FIGS. 19 and 20; discussed below), and so forth.

1-5-1. Console Box

The console box 31 is disposed on the left side of the operator's seat 30. The console box 31 could also be said to be disposed between the operator's seat 30 and the door opening 27. As shown in FIG. 4, the console box 31 is disposed substantially horizontally, and is formed longer in the forward and backward direction. Parts of the joystick 32 and the link 33, etc. (discussed below), are provided inside the console box 31. As shown in FIG. 4, the position of the console box 31, which is disposed substantially horizontally, is the operation position P1. The operation position P1 is the position of the console box 31 when the operator sits in the operator's seat 30 and operates the joystick 32.

The console box 31 also has a slot formation component 144. This will be discussed in detail below, but a linear slot 144a is formed in the slot formation component 144, and the first end 143a of the link rod 143 is slidably attached (see FIG. 22; discussed below).

The internal configuration of the console box 31 will be discussed in detail below, but the console box 31 is able to slide in the forward and backward direction, and in FIG. 4 is disposed at the rear end.

1-5-2. Joystick

As shown in FIG. 4, the joystick 32 is provided so as to protrude upward on the upper side near the front end 31a of the console box 31.

The joystick 32 is used to scoop up and transport soil and in other such jobs. The steering angle of the front frame 11 with respect to the rear frame 12 is changed by rotating the joystick 32 in the left and right direction. A guard member 39 that guards the joystick 32 is provided to the front end 31a of the console box 31.

1-5-3. Bellows 38

The bellows 38 is disposed between the floor 5a and the lower side of the console box 31 near the front end 31a. The lower end 38b of the bellows 38 is fixed to the floor 5a, and the upper end 38a is linked to the console box 31.

The bellows 38 covers the area around the link 33, which links the joystick 32 to a pilot valve 19 (discussed below).

1-5-4. Link

Figure 5:
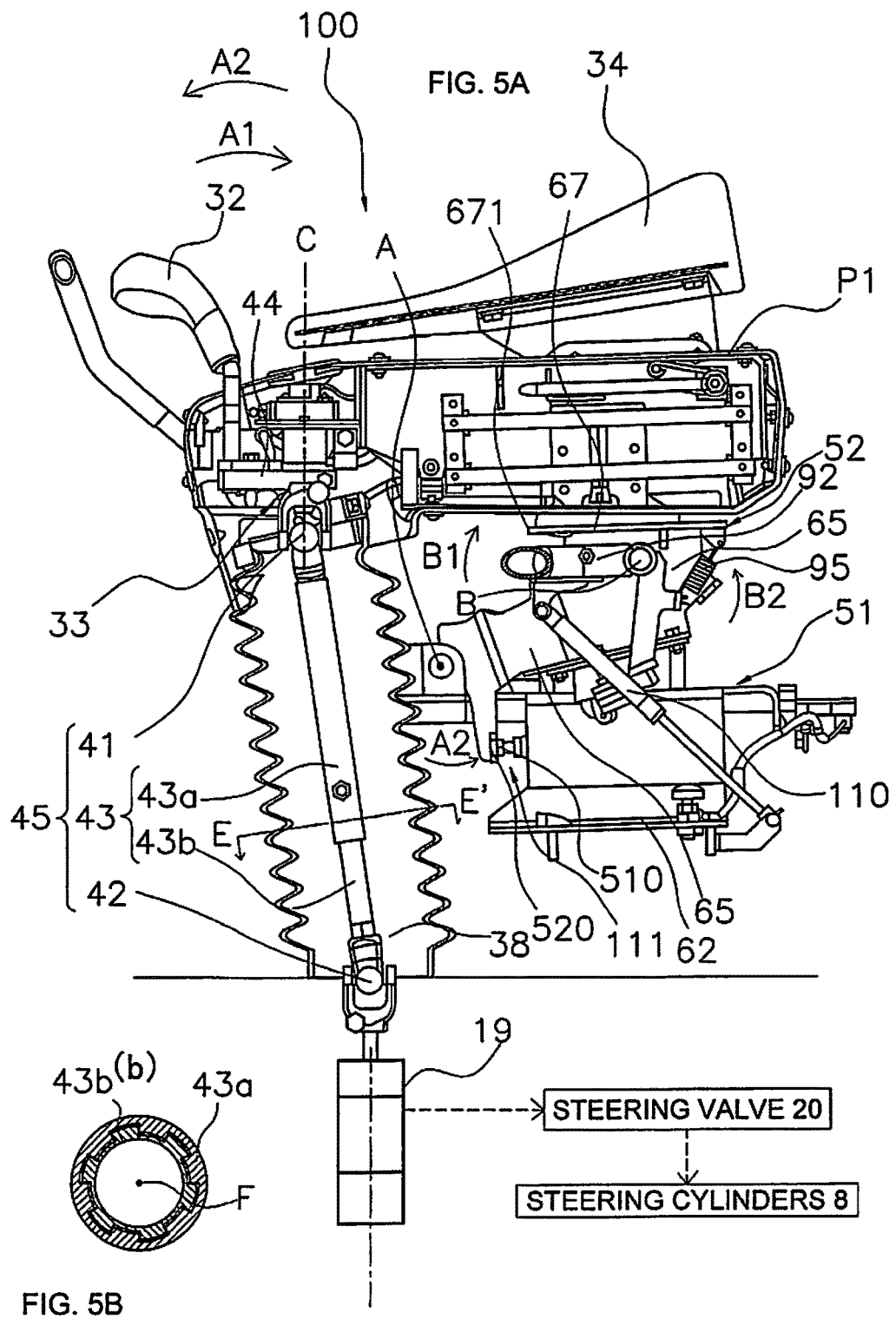
FIG. 5A shows the cross sectional configuration of FIG. 4.
FIG. 5B is a cross section along the E-E' line in FIG. 5A.
Figure 6:
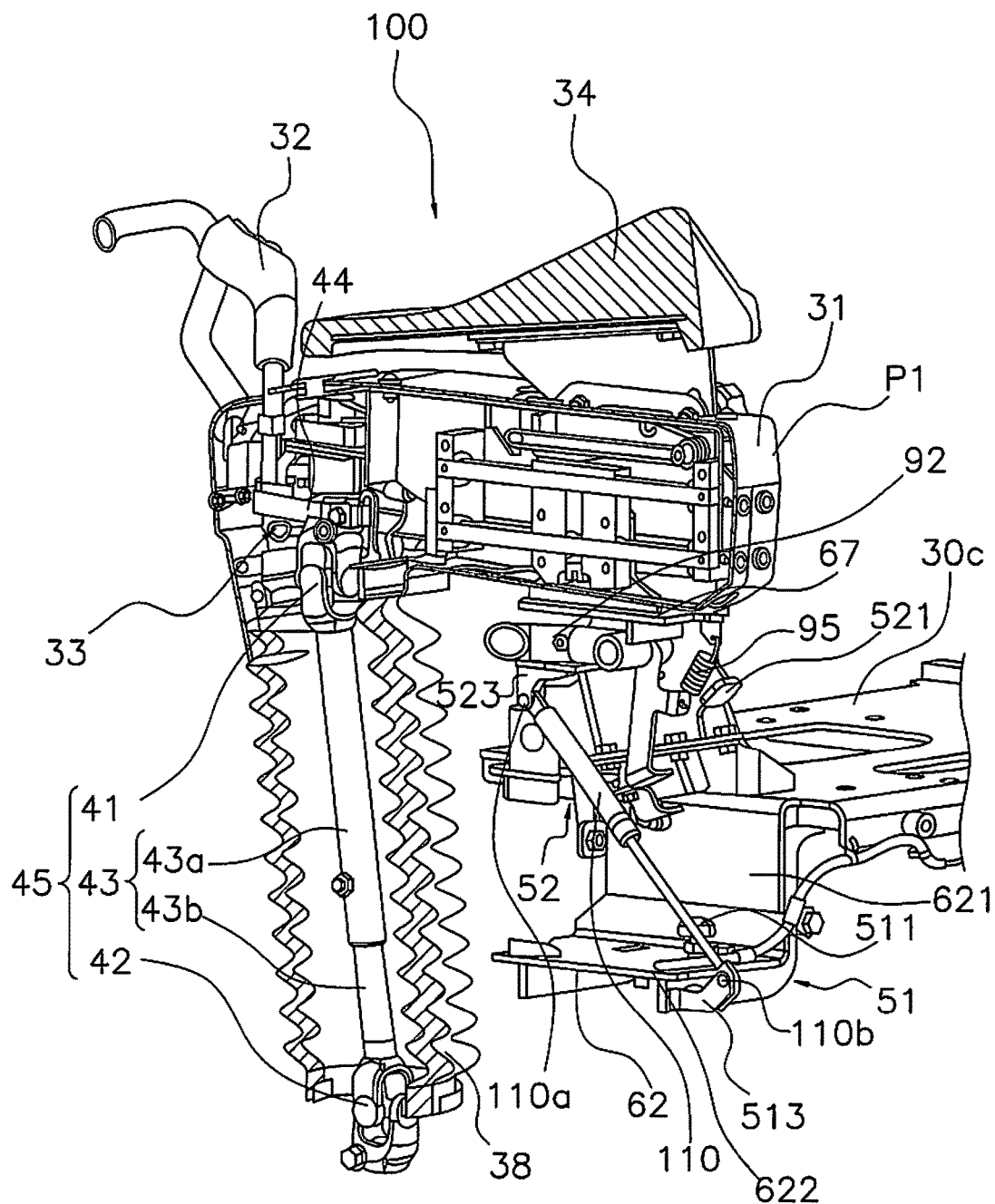
FIG. 6 is an oblique view of FIG. 5A.

FIG. 5A is a cross section of the console box assembly 100, and shows the interior of the bellows 38. FIG. 6 is an oblique view of FIG. 5A.

The link 33 links the joystick 32 to the pilot valve 19. The link 33 mainly has a linking bar 44 and a universal joint 45.

The linking bar 44 is disposed in the forward and backward direction, and links the joystick 32 to the universal joint 45. The joystick 32 is disposed facing upward at the upper end of the linking bar 44. The universal joint 45 is attached facing downward on the lower side of the rear end of the linking bar 44. The linking bar 44 is supported by the console box 31 so as to be able to rotate in the left and right direction around the axis C, which is the up and down direction, of the rear end to which the universal joint 45 is attached.

As shown in FIG. 5A, the universal joint 45 has a first joint 41, a second joint 42, and a telescoping part 43. The first joint 41 and the second joint 42 are disposed at both ends of the telescoping part 43. The telescoping part 43 is made up of an outer tube 43a and an inner tube 43b, and the outer tube 43a and the inner tube 43b are spline engaged.

FIG. 5B is a cross section along the E-E' line in FIG. 5A. As shown in FIG. 5B, a serrated groove is formed around the inside of the outer tube 43a, and a serrated groove that meshes with the serrated groove of the outer tube 43a is formed around the outside of the inner tube 43b. These grooves are formed in the lengthwise direction. This configuration causes the outer tube 43a and the inner tube 43b to be fixed to each other around the center axis F, allowing the operation of the joystick 32 to be transmitted. Also, the outer tube 43a and the inner tube 43b can move along the center axis F, which allow the telescoping part 43 to expand and contract.

The first joint 41 is attached on the lower side of the console box 31, and is linked by the linking bar 44 to the joystick 32. The second joint 42 is attached by being inserted into the floor 5a of the cab 5.

The second joint 42 of the link 33 is connected to the pilot valve 19. The operation of the joystick 32 is transmitted through the link 33 to the pilot valve 19, thus adjusting the pilot pressure inputted to a steering valve 20. The steering valve 20 adjusts the flow of fluid supplied to the steering cylinders 8 according to the inputted pilot pressure. Thus, steering operations can be performed by operating the joystick 32.

1-5-5. Armrest

As shown in FIG. 4, the armrest 34 is disposed on the upper side of the console box 31 via a bracket 341. In a state in which the console box 31 is disposed in the operation position P1, the armrest 34 is used to rest the arm of the operator sitting in the operator's seat 30.

1-5-6. Support Component

Figure 7:
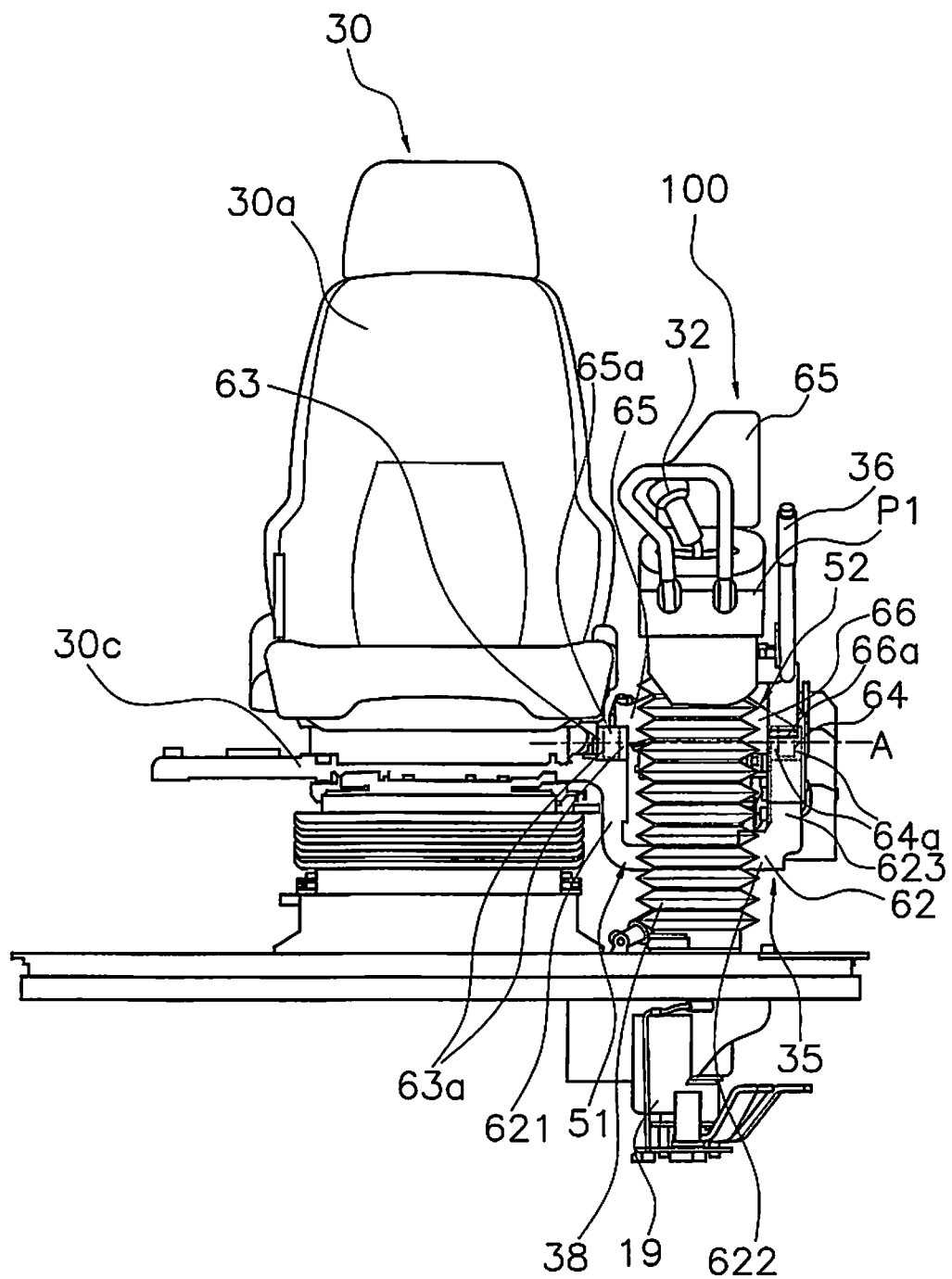
FIG. 7 is a front view of the operator's seat and the console box assembly in FIG. 4.
Figure 8:
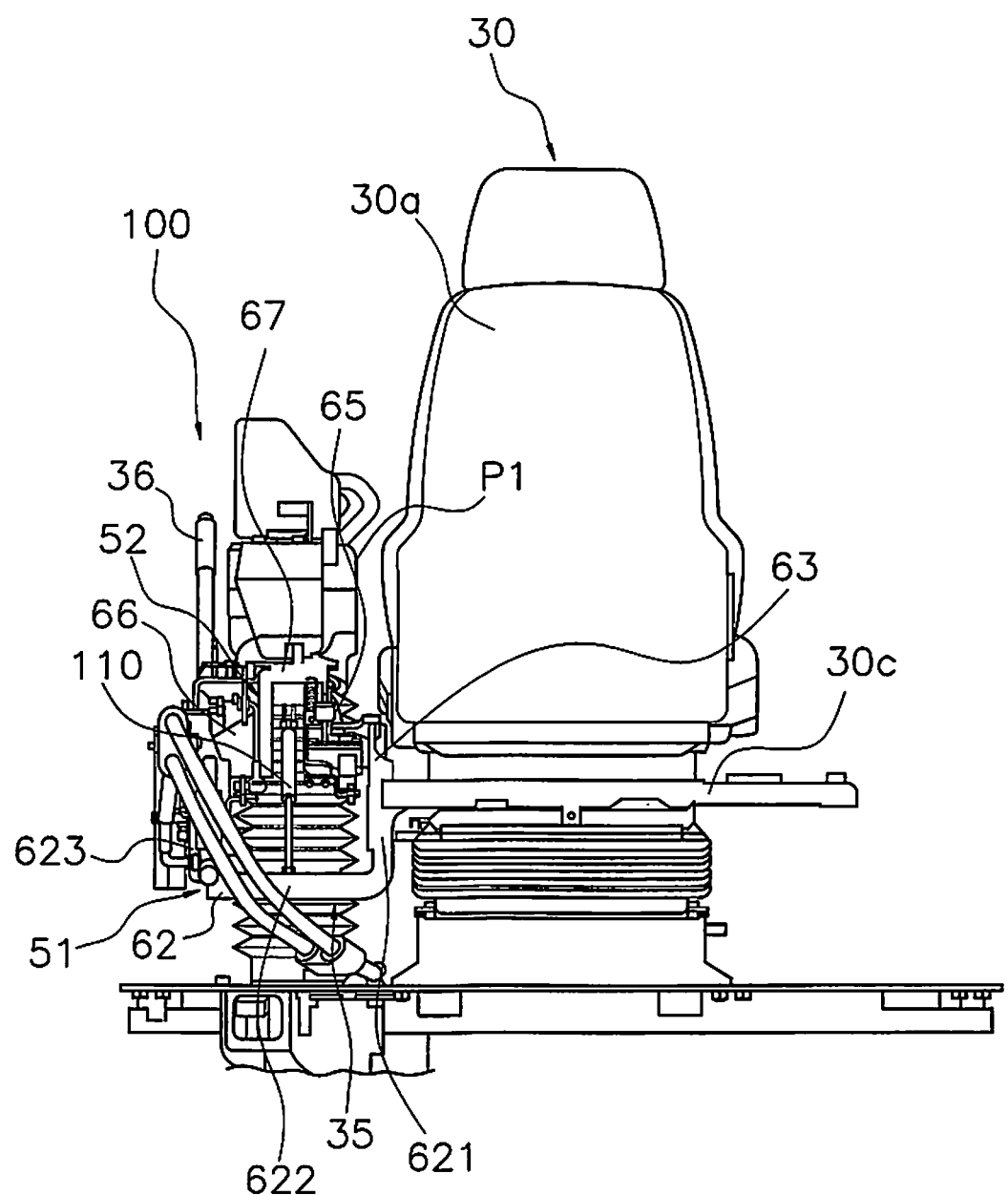
FIG. 8 is a rear view of the operator's seat and the console box assembly in FIG. 4.

FIG. 7 shows the area near the operator's seat 30 as seen from the front side. FIG. 8 shows the area near the operator's seat 30 as seen from the rear side.

As shown in FIGS. 4, 7, and 8, the support component 35 mainly has a fixed frame 51 and a rotary frame 52. The fixed frame 51 is fixed to the operator's seat 30. The rotary frame 52 is disposed on the upper side of the fixed frame 51, and is rotatably supported by the fixed frame 51. The rotary frame 52 slidably supports the console box 31.

a. Fixed Frame

As shown in FIG. 4, the fixed frame 51 is disposed on the rear side of the bellows 38 and below the console box 31. As shown in FIGS. 7 and 8, the fixed frame 51 is provided protruding toward the left side face from the lower frame 30c of the operator's seat 30.

As shown in FIG. 7, the fixed frame 51 has a fixed component 62, a first shaft support component 63, and a second shaft support component 64.

The fixed component 62 is connected to the lower frame 30c. The lower frame 30c protrudes to the left from the operator's seat 30, and the fixed component 62 is fixed to the left end of the lower frame 30c. The fixed component 62 is substantially U shaped when viewed in the forward and backward direction, and has a right side face 621, a bottom face 622, and a left side face 623.

The first shaft support component 63 is fixed to the right side face 621 of the fixed component 62. The second shaft support component 64 is fixed to the left side face 623 of the fixed component 62. The second shaft support component 64 is provided at a location opposite the first shaft support component 63 in the left and right direction. The first shaft support component 63 and the second shaft support component 64 rotatably support the rotary frame 52.

The first shaft support component 63 has two flat parts 63a disposed opposite each other with a specific space in between them in the left and right direction. A hole is formed in the left and right direction in each of the two flat parts 63a. A shaft that is fixed to the lower end 65a of a first rotary part 65 (discussed below) is inserted into these holes so that the first shaft support component 63 rotatably supports the first rotary part 65.

The second shaft support component 64 is fixed to the left side face 623 of the fixed component 62. The second shaft support component 64 has two flat parts 64a disposed opposite each other with a specific space in between them in the left and right direction. A hole is formed in the left and right direction in each of the two flat parts 64a. A shaft that is fixed to the lower end 66a of a second rotary part 66 (discussed below) is inserted into these holes so that the second shaft support component 64 rotatably supports the second rotary part 66.

b. Rotary Frame

The rotary frame 52 mainly has the first rotary part 65, the second rotary part 66, and a third rotary part 67 (see FIG. 8). The first rotary part 65 and the second rotary part 66 are disposed so as to be opposite and aligned in the left and right direction between the console box 31 and the fixed frame 51. The first rotary part 65 is disposed on the right side face 621 side, while the second rotary part 66 is disposed on the left side face 623 side. The first rotary part 65 and the second rotary part 66 are formed by being bent so that the space between them is substantially wider at the lower end than at the upper end.

The first rotary part 65 and the second rotary part 66 are linked at their upper ends to the third rotary part 67. The lower end 65a of the first rotary part 65 is inserted between the two flat parts 63a of the first shaft support component 63, and the shaft provided to the lower end 65a as discussed above is inserted into the holes in the flat parts 63a. The lower end 66a of the second rotary part 66 is inserted into the two flat parts 64a of the second shaft support component 64, and the shaft provided to the lower end 66a as discussed above is inserted into the holes in the flat parts 64a.

The shaft provided to the lower end 65a and the shaft provided to the lower end 66a are disposed coaxially (rotary shaft A) in the left and right direction.

The first rotary part 65 and the second rotary part 66 are able to rotate with respect to the fixed frame 51, around the rotary shaft A.

As shown in FIG. 8, the third rotary part 67 is linked to the upper end of the first rotary part 65 and to the upper end of the second rotary part 66, and slidably supports the console box 31. Therefore, the rotation of the first rotary part 65 and the second rotary part 66 causes the console box 31 to rotate as well.

The rotary shaft A of the console box 31 is the center of a first shaft 53 and a second shaft 54, and is shown in FIG. 4, FIG. 7, etc. As shown in FIG. 4, this rotary shaft A is on the lower side of the console box 31, and is disposed more to the front than the middle (see the line LM) of L1 between the front end 31a and the rear end 31b of the console box 31.

In the operation position P1, the console box 31 is substantially the same height as its front end 31a and rear end 31b, and is disposed substantially horizontally, as shown in FIG. 4.

Figure 9:
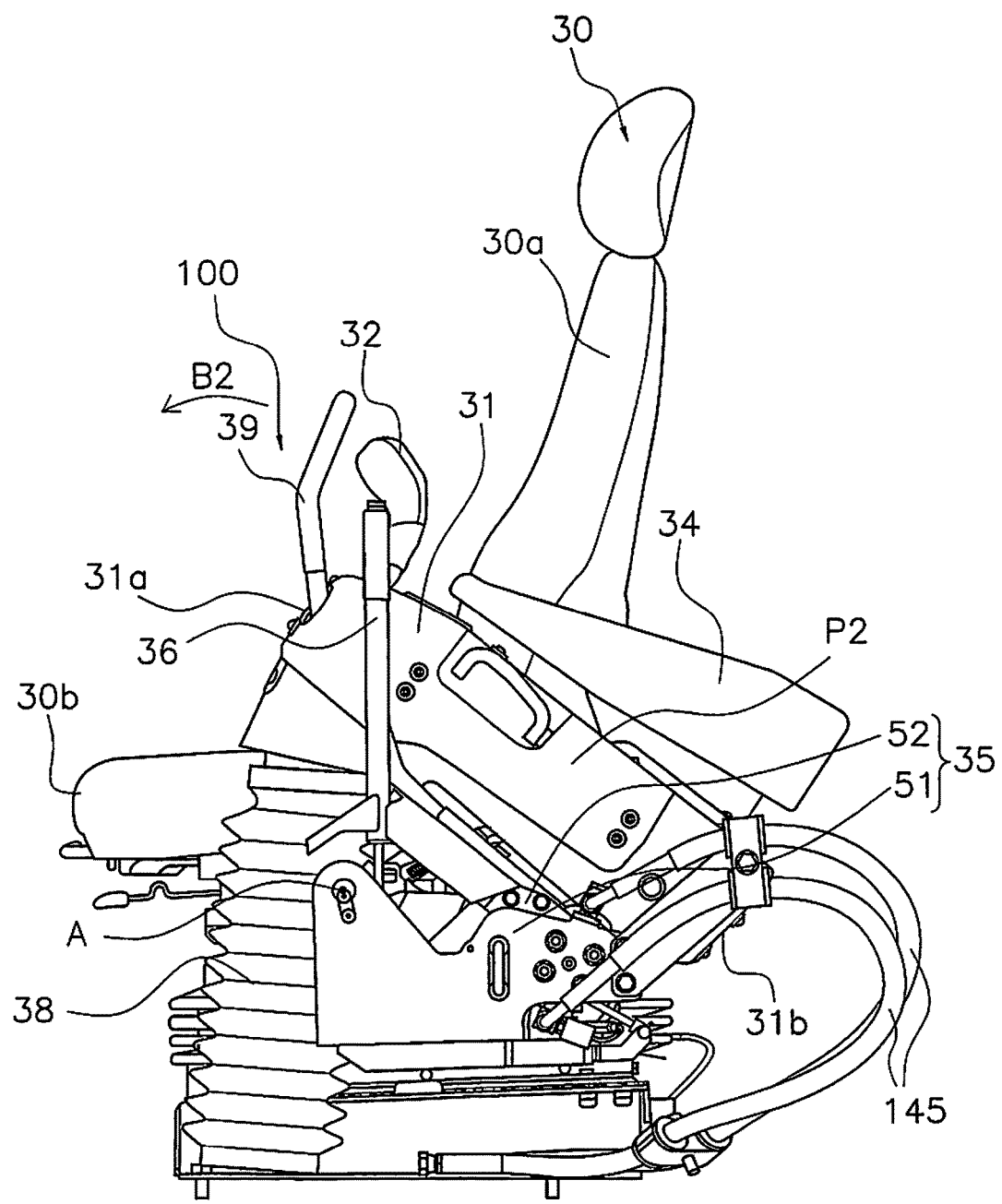
FIG. 9 is a side view of the operator's seat in FIG. 3 and the console box assembly in a state in which the console box is disposed in the retracted position.

FIG. 9 is a side view of the console box assembly 100 when the console box 31 is disposed in a retracted position P2. When the operator grasps the rotary lever 36 (discussed below) in a state in which the console box 31 is disposed in the operation position P1 as in FIG. 4, and rotates the rotary lever 36 rearward as indicated by the arrow A1 in FIG. 4, the console box 31 rotates around the rotary shaft A until the console box 31 is disposed in the retracted position P2.

Figure 10:
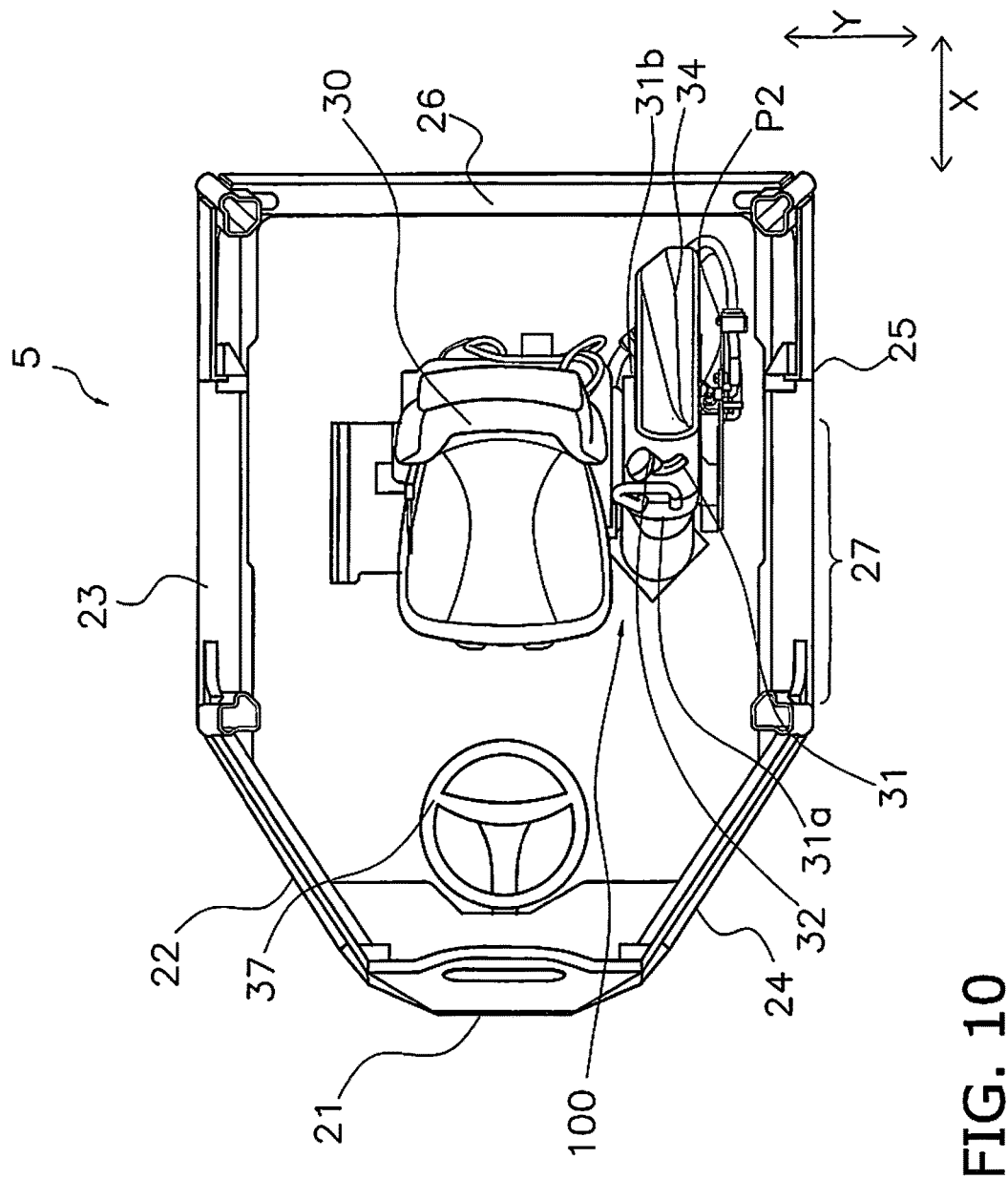
FIG. 10 is a top view of the state when the console box is disposed in the retracted position.
Figure 11:
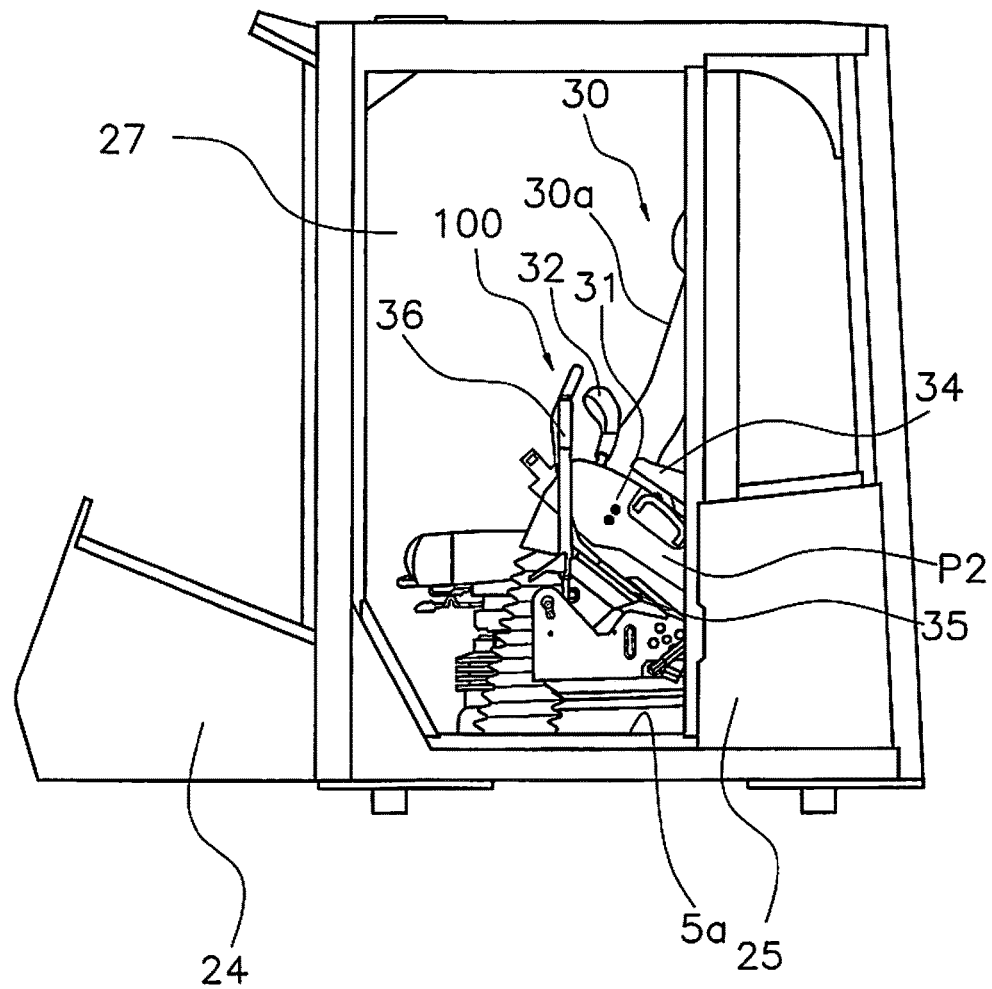
FIG. 11 is a left side view of the configuration of the cab in FIG. 1 in a state in which the console box is disposed in the retracted position.

FIG. 10 is a top view of the state when the console box 31 is disposed in the refracted position P2. FIG. 11 is a left side view of FIG. 10.

As shown in FIG. 10, in the retracted position P2, the console box 31 is disposed at an angle. More precisely, the rear end 31b of the console box 31 is located lower than the front end 31a.

As shown in FIGS. 3 and 11, when the console box 31 is rotated rearward to the retracted position P2, this makes it easier for the operator to move in and out of the door opening 27.

c. Slide Mechanism

Figure 12:
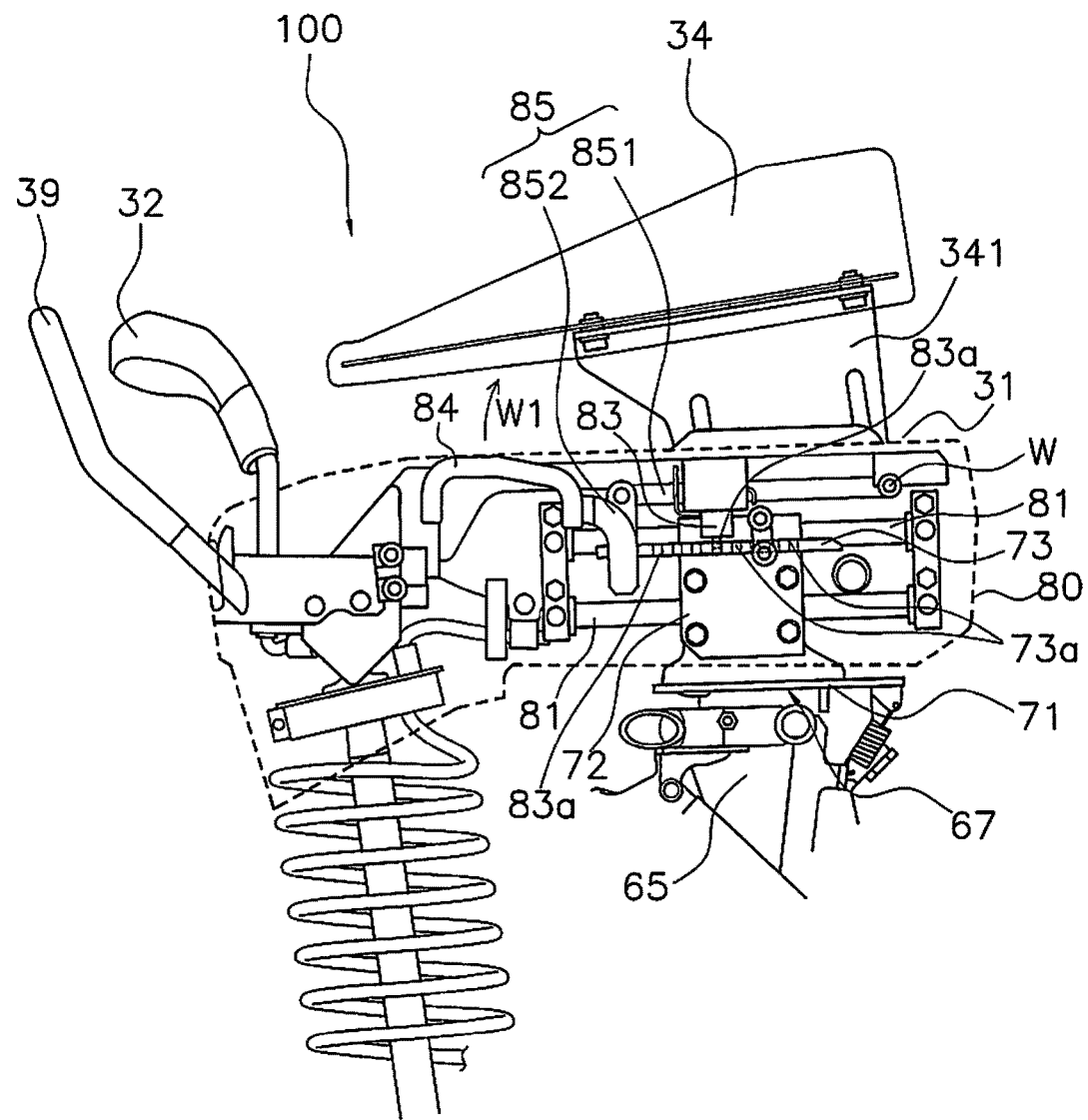
FIG. 12 shows the internal configuration of the console box in FIG. 4.

FIG. 12 shows the slide mechanism of the console box 31. As shown in this drawing, the third rotary part 67 has a connection 71, a rail support member 72, and a positioning member 73.

The connection 71 is connected to the upper ends of the first rotary part 65 and the second rotary part 66. The rail support member 72 is a cuboid member, is fixed to the connection 71 on the upper side of the connection 71, and slidably supports two rail members 81 (discussed below). The positioning member 73 is a flat member that is longer in the forward and backward direction, and is fixed to the rail support member 72. A plurality of holes 73a formed in the up and down direction are provided to the positioning member 73 in the forward and backward direction.

The console box 31 has an outer frame 80 (indicated by a dotted line in FIG. 12), the two rail members 81 fixed to the outer frame 80, a pin 83 fixed to the outer frame 80, a slide grip 84, and a linking component 85. The rail members 81 are provided in the forward and backward direction, and are supported slidably in the forward and backward direction by the rail support member 72. The pin 83 is disposed in the up and down direction, and a lower end 83a of the pin 83 fits into the above-mentioned holes 73a of the positioning member 73. This fixes the position of the console box 31 in the forward and backward direction. The slide grip 84 is provided on the left side face side of the outer frame 80 of the console box 31.

The linking component 85 links the slide grip 84 to the pin 83. The linking component 85 has a post-shaped portion 851 that is provided in the forward and backward direction and to which the pin 83 is fixed, and a linking portion 852 that links the post-shaped portion 851 to the slide grip 84. The post-shaped portion 851 is provided rotatably with respect to the rail members 81 around the rotary shaft W of its rear end.

When the console box 31 is slid in the forward and backward direction, the slide grip 84 is grasped and lifted by the operator. Consequently, the linking component 85 rotates upward (in the direction of the arrow WI) around the rotary shaft W, and the pin 83 fixed to the linking component 85 also rotates upward. The rotation of the pin 83 causes its lower end 83a to be pulled upward and out of the holes 73a, resulting in a state in which the fixing is released. In this state, the rail members 81 can slide with respect to the rail support member 72, so the console box 31 can be slid in the forward and backward direction. If the console box 31 is moved downward at the desired position in the forward and backward direction, the lower end 83a of the pin 83 fits into the holes 73a, and the position of the console box 31 is fixed with respect to the third rotary part 67.

FIGS. 13A to 13C are side views of the state when the console box 31 has been slid in the operation position P1. FIG. 13A is a side view of the console box assembly 100 in a state in which the console box 31 has been moved all the way to the rear in the operation position. FIG. 13B is a side view of the console box assembly 100 in a state in which the console box 31 has been moved to an intermediate position in the forward and backward direction in the operation position. FIG. 13C is a side view of the console box assembly 100 in a state in which the console box 31 has been moved all the way to the front in the operation position.

As shown in FIGS. 13A to 13C, the console box 31 slides in the forward and backward direction. The center of gravity H of the console box 31 here is provided more to the front than the rotary shaft A of the console box 31 even in a state in which the console box 31 has been slid all the way to the rear. J indicates a vertical line passing through the rotary shaft A. This center of gravity H refers to the center of gravity of the overall configuration, including the components that rotate along with the console box 31, such as the rotary frame 52.

With this configuration, when the console box 31 is rotated rearward, the console box 31 tries to return to the operation position P1 under its own weight, based on the position of the center of gravity H, until the center of gravity H goes past the vertical line J to the rear. This prevents the console box 31 from rotating rearward as a result of vibration or the like.

Figure 14A:
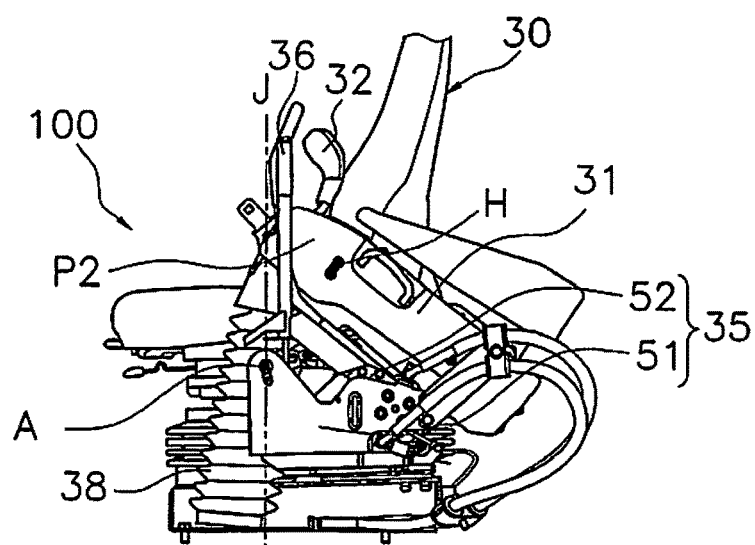
FIGS. 14A to 14C are side views illustrating the center of gravity position in the retracted position when the console box in FIG. 3 has been slid.
Figure 14B:
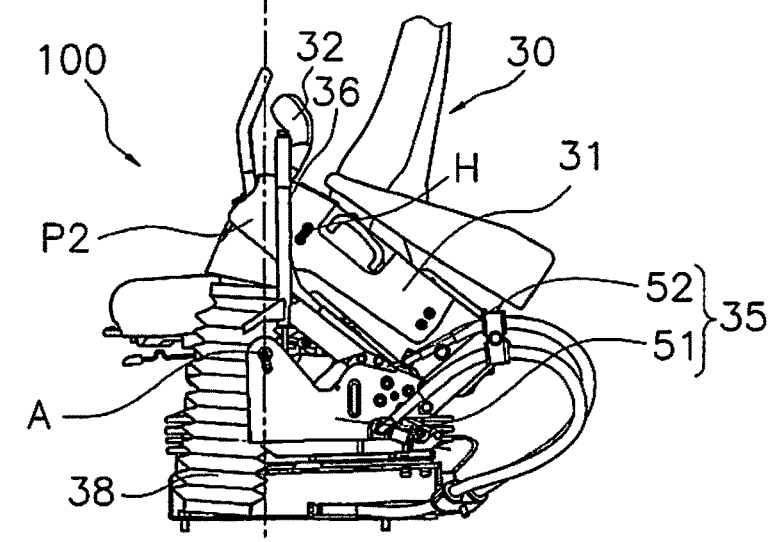
Figure 14C:
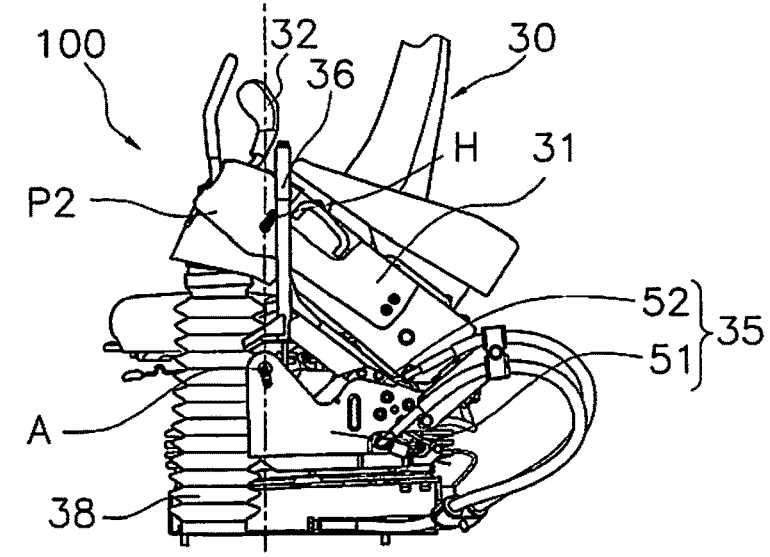

FIGS. 14A to 14C are side views of the state when the console box 31 has been slide in the retracted position P2. FIG. 14A is a side view of the console box assembly 100 in a state in which the console box 31 has been moved all the way to the rear in the retracted position P2. FIG. 14B is a side view of the console box assembly 100 in a state in which the console box 31 has been moved to an intermediate position in the forward and backward direction in the retracted position. FIG. 14C is a side view of the console box assembly 100 in a state in which the console box 31 has been moved all the way to the front in the retracted position.

As shown in FIGS. 14A to 14C, the console box 31 slides in the forward and backward direction. The center of gravity H of the console box 31 here is provided more to the rear than the rotary shaft A of the console box 31, even in a state in which the console box 31 has slide all the way forward.

With the above configuration, when the console box 31 rotates forward, the console box 31 tries to return to the retracted position P2 under its own weight, based on the position of the center of gravity H, until the center of gravity H passes the vertical line J to the front. This prevents the console box 31 from rotating forward as a result of operator contact, etc.

1-5-7. Rotary Lever

Figure 15:
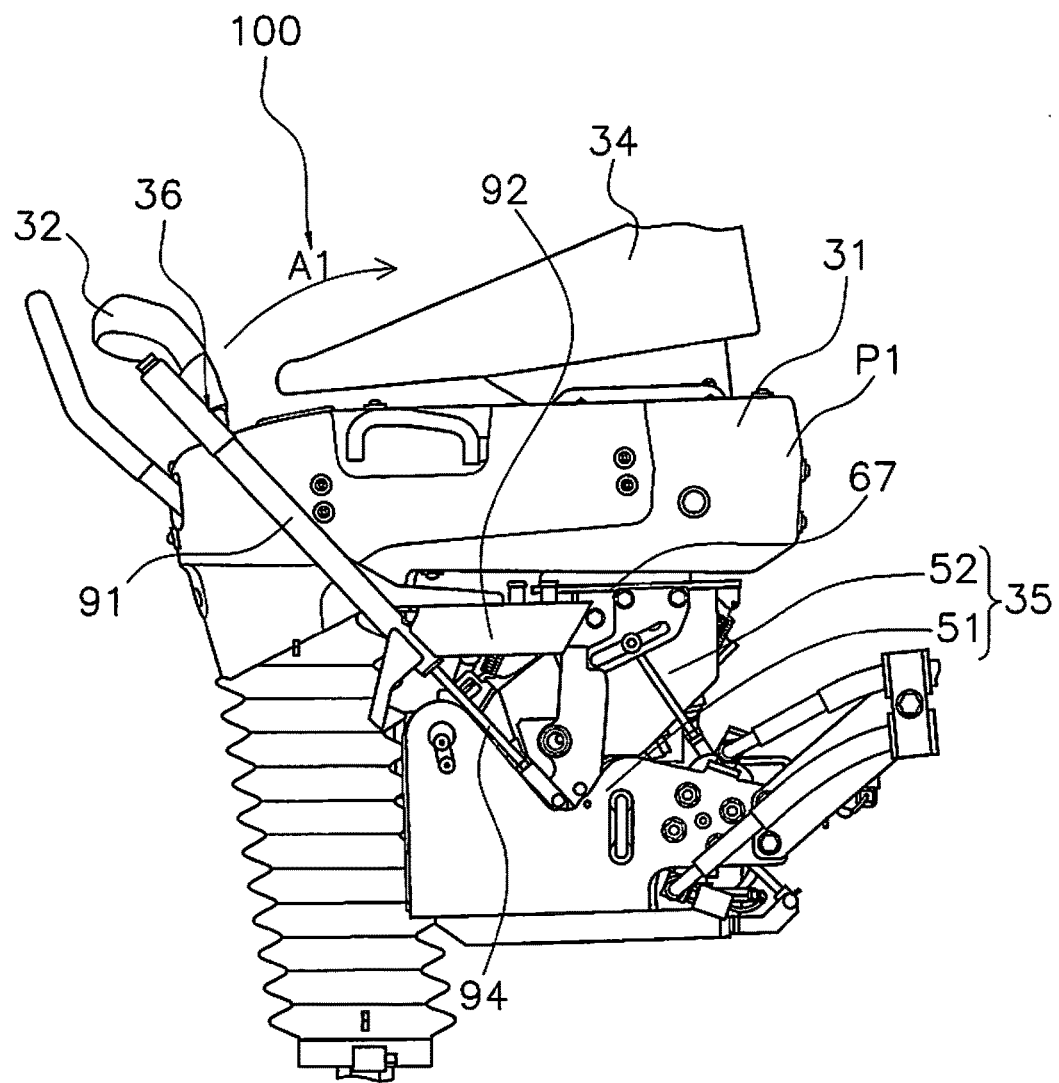
FIG. 15 is a side view in which part of an outer cover has been removed from the console box assembly in FIG. 3, to illustrate the rotary lever.

The rotary lever 36 is grasped by the operator when the console box 31 is rotated. FIG. 15 shows the configuration of the console box assembly 100 in a state in which the covers 53*a* and 53*b* (see FIG. 4) provided to the left side face of the fixed frame 51 have been removed.

The rotary lever 36 is provided to the left side face of the console box assembly 100. The rotary lever 36 mainly has a grip 91 and a contact component 92. The grip 91 is a cylindrical member that is grasped by the operator.

The contact component 92 hits the rotary frame 52 when the rotary lever 36 is rotated, causing the rotary frame 52 to rotate. As shown in FIGS. 5 and 15, the contact component 92 extends substantially horizontally from the lower end of the grip 91 to the lower side of the third rotary part 67. In FIG. 5, the contact component 92 is depicted as being cut off midway. The contact component 92 is rotatably fixed at the rear end of the contact component 92, inside the first rotary part 65 of the rotary frame 52. The rotary shaft B thereof is shown in FIG. 5. The rotary shaft B is provided on the lower side of the third rotary part 67. One end of a spring member 95 is linked to a member extended downward from the rear end of the contact component 92. The other end of this spring member 95 is linked to the rear end of the third rotary part 67 of the rotary frame 52. One end of the spring member 95 is disposed under and ahead of the other end. The spring member 95 biases the entire rotary lever 36 to rotate forward around the rotary shaft B (the arrow B2 direction).

Figure 16:
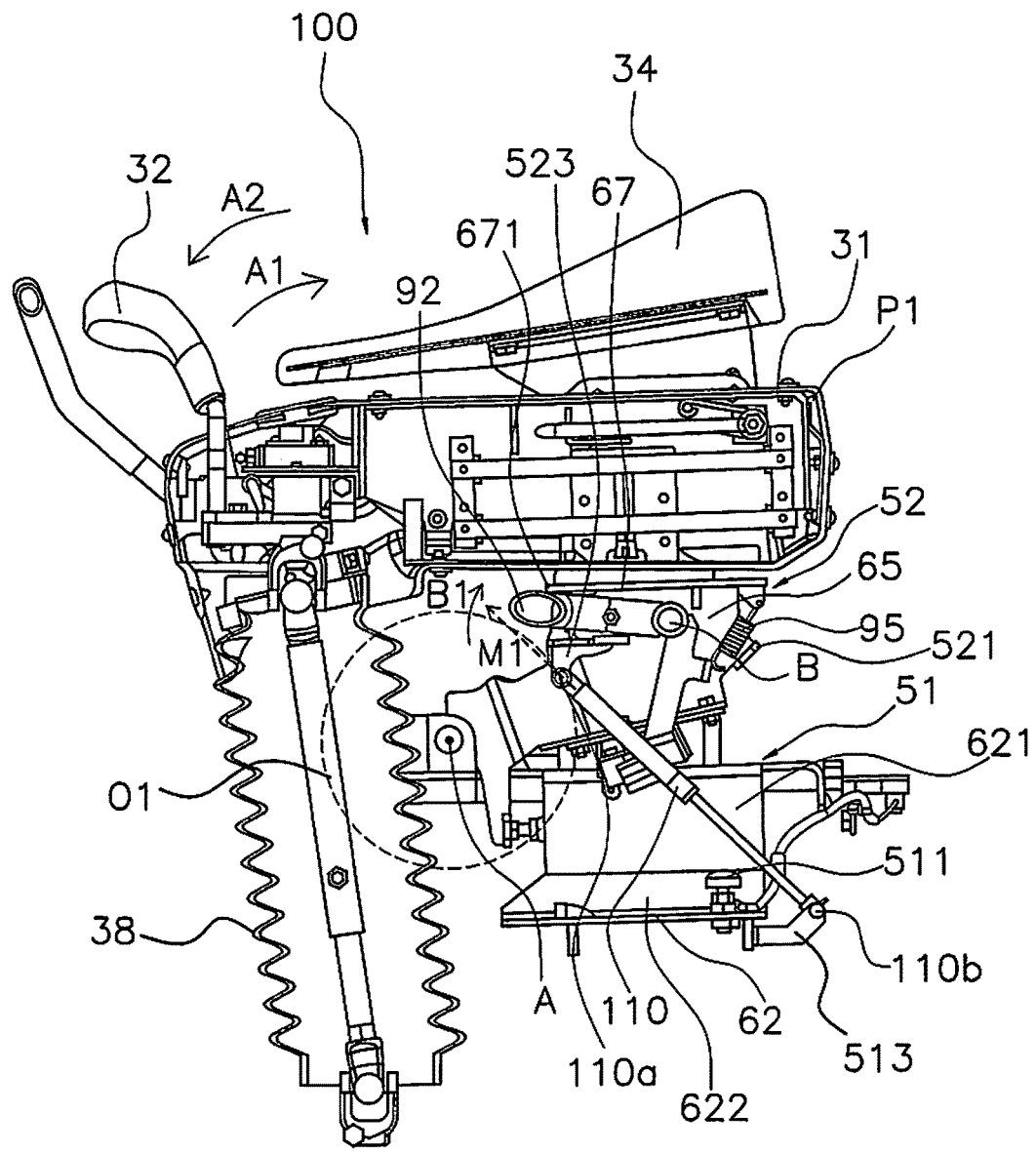
FIG. 16 is a side cross section of the console box assembly in FIG. 3, to illustrate a gas cylinder.

When the operator rotates the rotary lever 36 in the arrow B1 direction, the contact component 92 hits a contacted part 671 (see FIG. 5) of the third rotary part 67 from below. As shown in FIG. 5, the contacted part 671 is formed above the contact component 92 in an eave shape that protrudes forward along the contact component 92. FIG. 16 shows the state when the contact component 92 is in contact with the contacted part 671 of the third rotary part 67. When the rotary lever 36 is further rotated in the arrow B1 direction from this state, the rotary frame 52 rotates rearward (arrow A1) around the rotary shaft A along with the rotation of the rotary lever 36. Thus, the rotary shaft A of the console box 31 is in a different position from that of the rotary shaft B of the rotary lever 36, and is provided more to the front than the rotary shaft B. Accordingly, the rearward and forward rotation of the console box 31 are indicated by the arrows A1 and A2, and the rearward and forward rotation of the rotary lever 36 are distinguished by the arrows B1 and B2, but in the left side view shown in FIG. 16, the arrows A1 and B1 both indicate the right rotation direction, while the arrows A2 and B2 both indicate the left rotation direction.

As shown in FIG. 3, in a state in which the console box 31 is disposed in the operation position P1, the rotary lever 36 is blocking the passage between the operator's seat 30 and the door opening 27, so the operator cannot get in or out. On the other hand, as shown in FIG. 11, in a state in which the console box 31 is disposed in the retracted position P2, the rotary lever 36 is retracted from the passage between the operator's seat 30 and the door opening 27, so the operator can get in and out.

1-5-8. Gas Spring

As shown in FIG. 8, the gas spring 110 is provided on the inside of the support component 35. More precisely, it is provided on the inside of the substantially U-shaped fixed component 62, and between the first rotary part 65 and the second rotary part 66.

Figure 17:
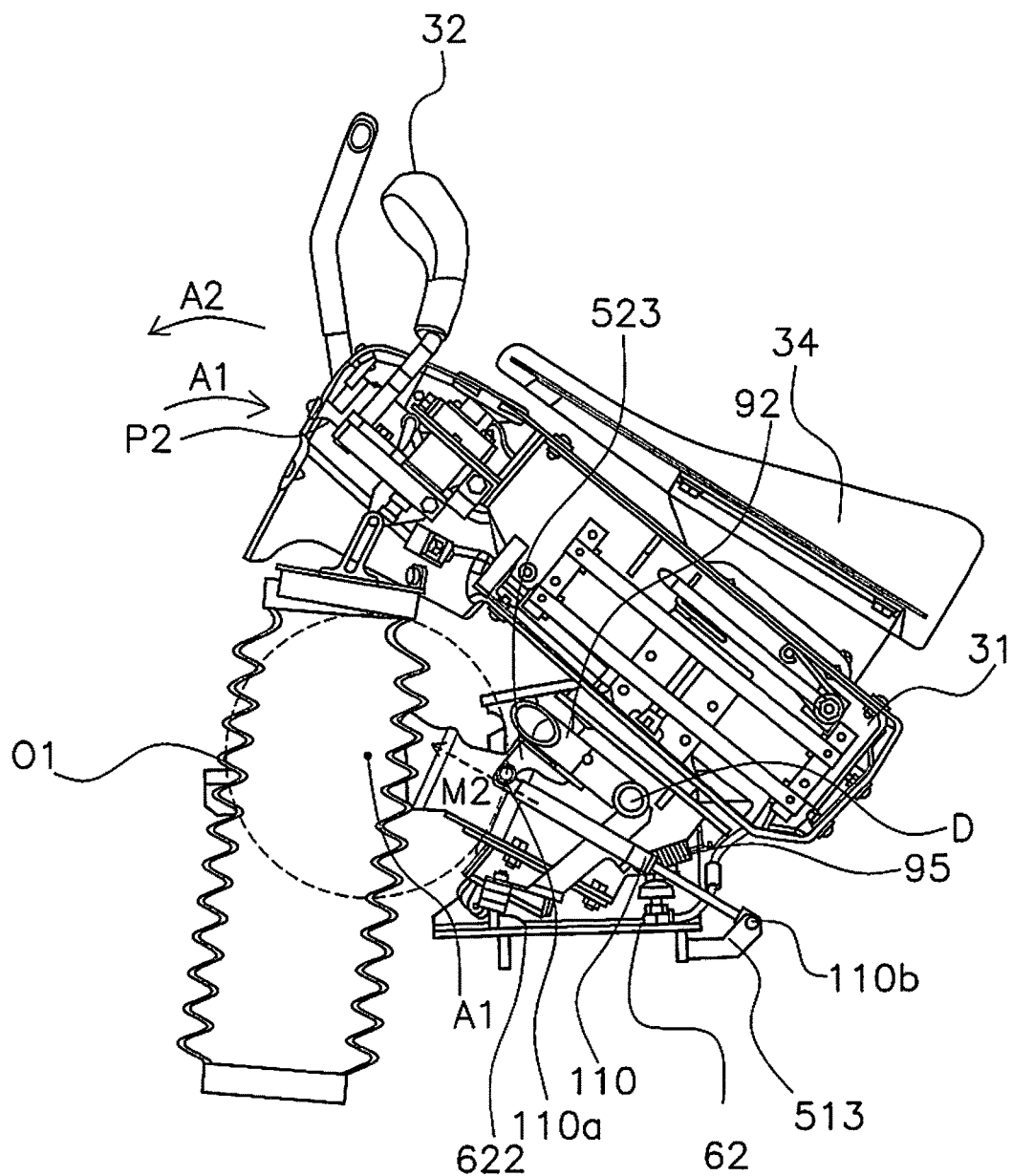
FIG. 17 is a side cross section of the state when the console box has been rotated from the state in FIG. 16 to the retracted position.
Figure 18:
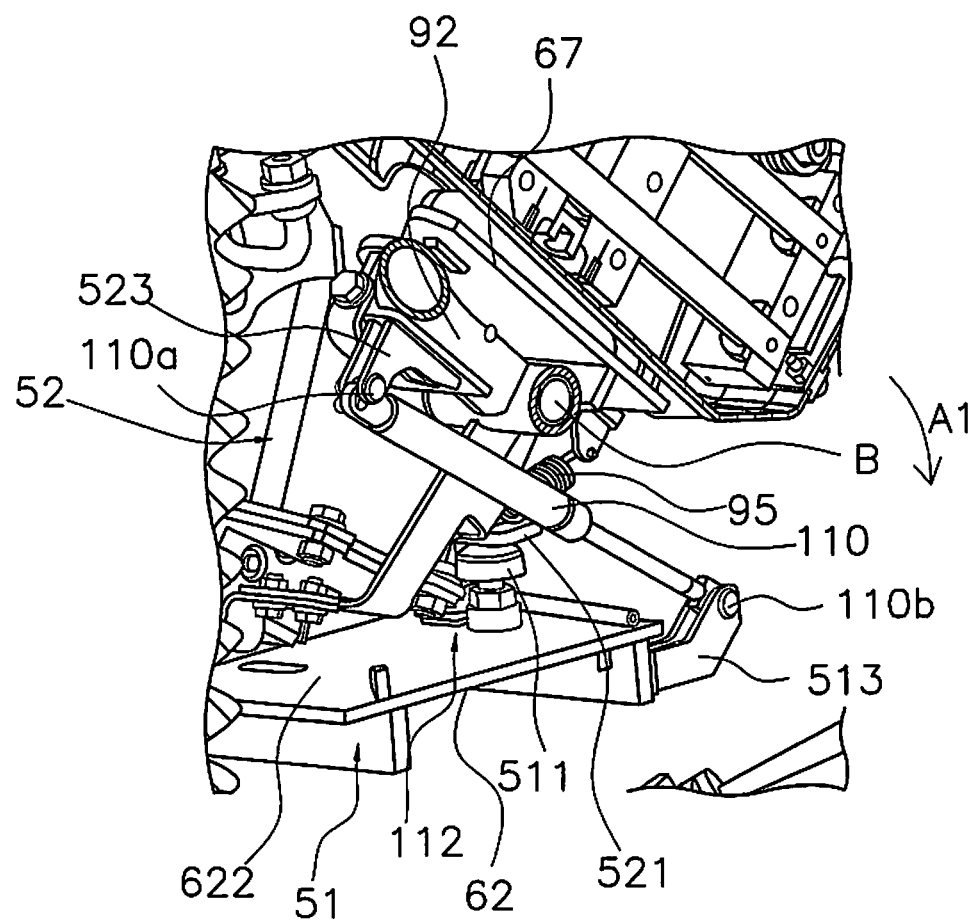
FIG. 18 is an oblique view of the area near the gas cylinder in FIG. 17.

FIG. 17 is a side view of the state of the gas spring 110 when the console box 31 has been rotated to the retracted position P2. FIG. 18 is an oblique view of the state of the gas spring 110 when the console box 31 has been rotated to the retracted position P2.

As shown in FIG. 6 and FIGS. 16 to 18, the upper end 110*a* of the gas spring 110 is rotatably attached to the rotary frame 52 via a bracket 523. The upper end 110*a* is located lower than the contact component 92 of the rotary lever 36.

The lower end 110*b* of the gas spring 110 is rotatably attached to the bottom face 622 of the fixed component 62 via a bracket 513.

The lengthwise direction of the gas spring 110 runs in the forward and backward direction in plan view, its upper end 110*a* is located more to the front than the lower end 110*b*, and the upper end 110*a* is located higher than the lower end 110*b*.

The gas spring 110 biases in the extension direction, and its upper end 110*a* is located more to the rear than the rotary shaft A of the console box 31, so as shown in FIG. 16, in the operation position P1 the console box 31 is biased in the forward rotational direction (the arrow A2 direction).

As shown in FIG. 16, the gas spring 110 is disposed so that in a state in which the console box 31 is disposed in the operation position P1, the extension direction of the gas spring 110 substantially matches the linear direction (the MI direction) of a circle O1 whose center is the rotary shaft A of the console box 31. This allows the biasing force of the gas spring 110 to be exerted more efficiently.

The gas spring 110 contracts along with the rotation of the console box 31, and in a contracted state, as shown in FIG. 17, the extension direction of the gas spring 110 departs from the linear direction of the circle O1, and moves to the rotary shaft A direction. Consequently, in the retracted position P2, the forward biasing force of the gas spring 110 on the console box 31 can be reduced. Therefore, the weight of the console box 31 is greater than the biasing force produced by the gas spring 110, and the console box 31 can be stably disposed in the retracted position P2. To put this another way, the rotational moment produced in the console box 31 by the biasing force of the gas spring 110 in the retracted position P2 is less than the rotational moment produced by the weight of the console box 31.

Also, the gas spring 110 can adjust the angle to switch the return to the operation position P1 and the return to the retracted position P2. For example, if the center of gravity position of the console box 31 should be shifted from the desired position due to some error, this can be adjusted for by the gas spring 110.

1-5-9. Operation Position Stopper

Figure 20:
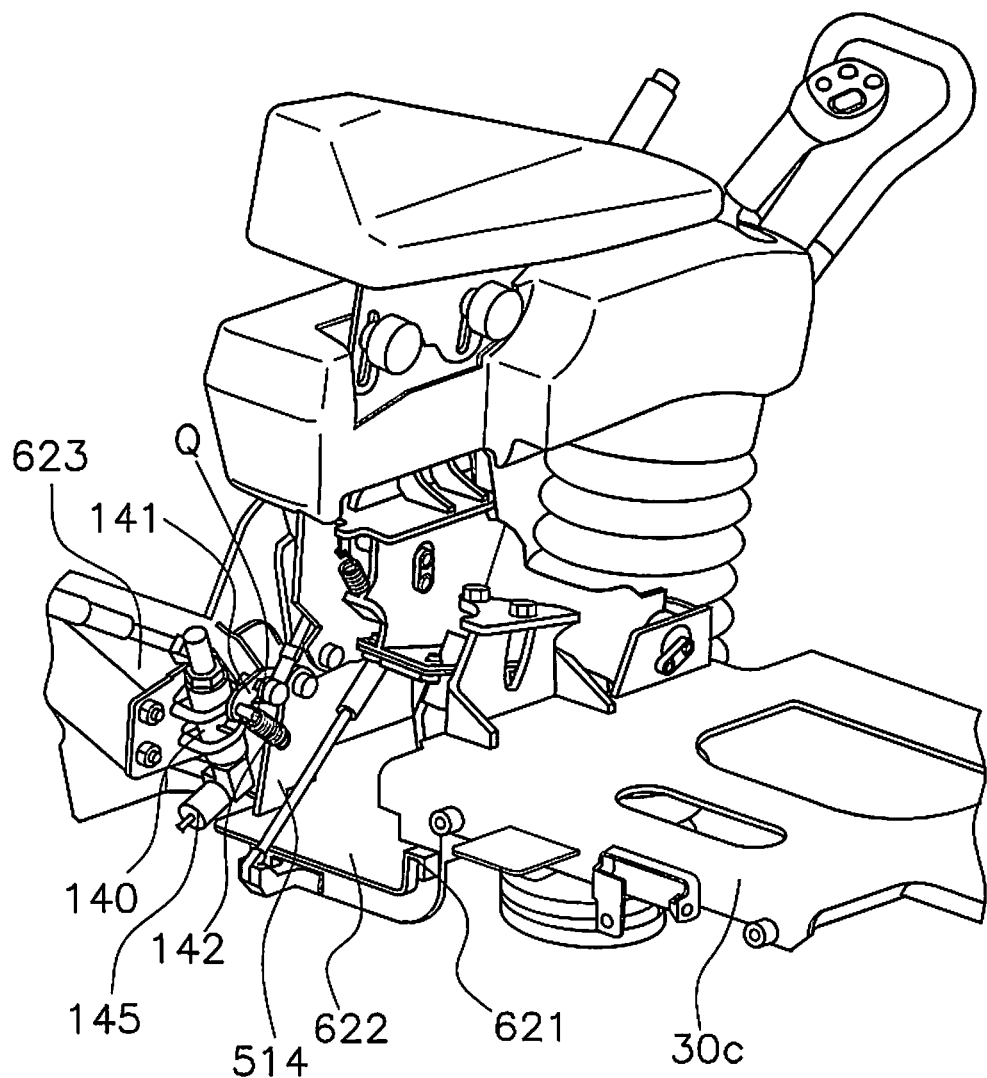
FIG. 20 is a rear oblique view of the console box assembly in FIG. 4, and illustrates the steering lock mechanism.

The operation position stopper 111 stops the console box 31 in the operation position P1 when the console box 31 is rotated forward from the retracted position P2 toward the operation position P1. As shown in FIGS. 5 and 20 (discussed below), the operation position stopper 111 has a first contact component 520 provided to the rotary frame 52, and a first contacted component 510 provided to the fixed frame 51. The first contact component 520 protrudes downward from the rear side of the rotary shaft A of the first rotary part 65. Also, the first contacted component 510 is provided so as to protrude forward from the front end of the fixed component 62 of the fixed frame 51, and is a bolt stopper. When the console box 31 is rotated forward from the retracted position P2 toward the operation position P1 (the arrow A2 direction), the first contact component 520 rotates rearward (arrow A2) and hits the first contacted component 510 from the front. Consequently, the rotation of the console box 31 stops in the operation position P1.

1-5-10. Retracted Position Stopper

The retracted position stopper 112 stops the console box 31 in the retracted position P2 when the console box 31 is rotated rearward from the operation position P1 toward the retracted position P2.

As shown in FIG. 18, the retracted position stopper 112 has a second contact component 521 provided to the rotary frame 52, and a second contacted component 511 provided to the fixed frame 51. As shown in FIG. 6, the second contact component 521 is disposed to the rear of the spring member 95 in the operation position P1, and as shown in FIG. 18, is disposed under the spring member 95 in the retracted position P2. The second contacted component 511 is provided on the bottom face 622 of the fixed component 62 so as to protrude above, and its distal end is formed from a rubber member or the like.

When the console box 31 is rotated rearward from the operation position P1 toward the retracted position P2 (the arrow A1 direction), the second contact component 521 rotates rearward (arrow A1) and hits the second contacted component 511 from above. Consequently, the rotation of the console box 31 stops in the retracted position P2.

1-5-11. Steering Lock Mechanism

The steering lock mechanism 115 is designed so that when the rotary lever 36 retracts from the passageway from the operator's seat 30 to the door opening 27, the steering will be locked even if the joystick 32 is operated.

Figure 19:
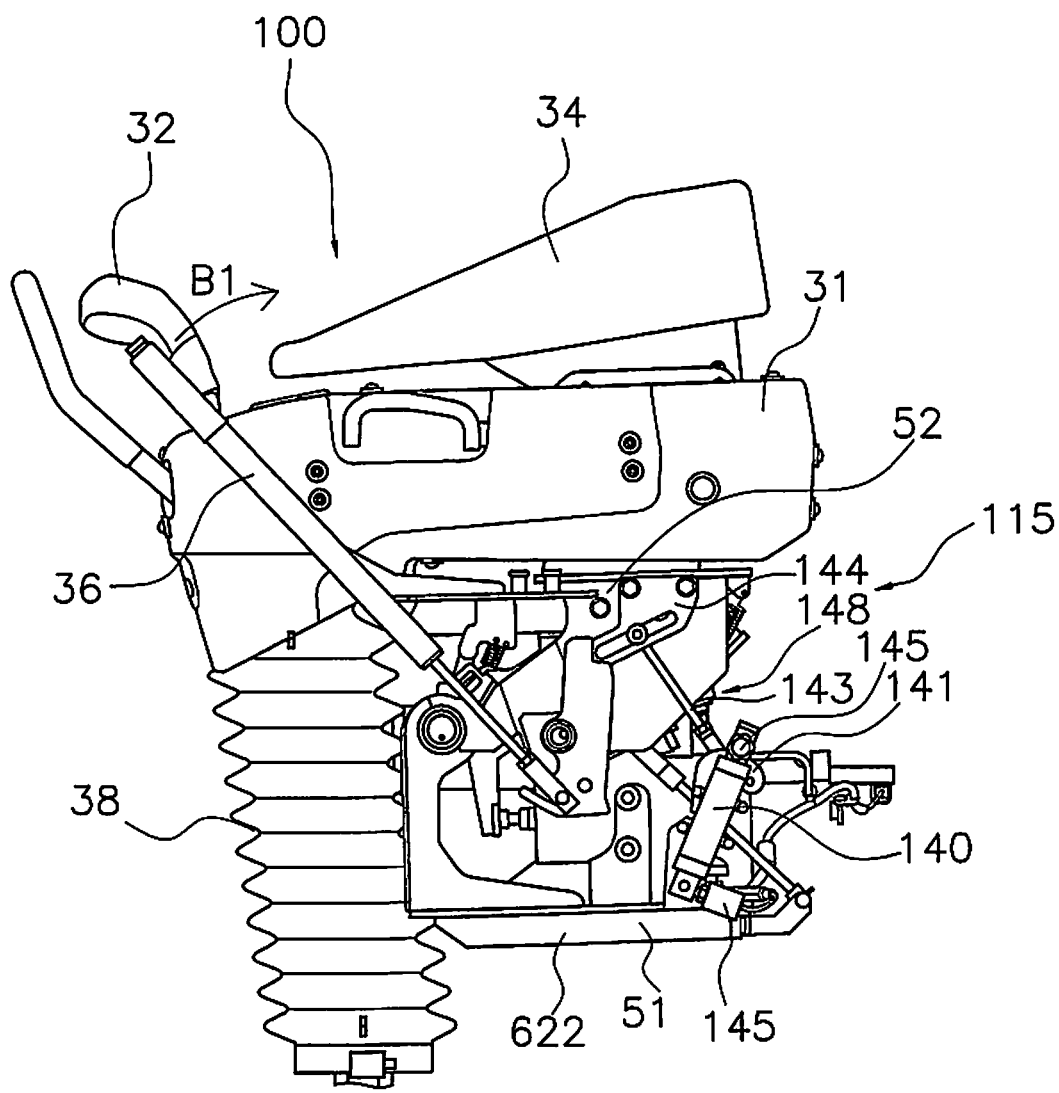
FIG. 19 is a side view of the console box assembly in FIG. 4, and illustrates the steering lock mechanism.

FIG. 19 is a side view of the console box assembly 100, and shows the state when the left side face 623 of the fixed frame 51 has been removed. FIG. 20 is an oblique view of the console box assembly 100 from the right-rear.

As shown in FIG. 19, the steering lock mechanism 115 has a shutoff valve 140 and a shutoff valve operation mechanism 148 that operates the shutoff valve 140. The shutoff valve 140 will be discussed in detail below, but blocks off the pilot fluid supplied to the steering valve 20. The shutoff valve operation mechanism 148 puts the shutoff valve 140 in an open state or a blocked state by means of a mechanical link mechanism, along with the rotation of the rotary lever 36.

The shutoff valve operation mechanism 148 has an opening and closing lever 141, a spring member 142 (see FIG. 20), and the link rod 143.

a. Shutoff Valve, Opening and Closing Lever

As shown in FIG. 20, the shutoff valve 140 is disposed at the rear end portion and inside the left side face 623 of the fixed frame 51. Also, the shutoff valve 140 is connected to a pilot pipe 145 from and into which the pilot fluid flows. The opening and closing lever 141 is provided rotatably around the shaft Q with respect to the shutoff valve 140, the shutoff valve 140 opens and closes, and pilot fluid is supplied and halted, according to the rotation of the opening and closing lever 141.

The actuator drive-use hydraulic circuit 200 will now be described. As shown in FIG. 21, the actuator drive-use hydraulic circuit 200 has the above-mentioned steering cylinders 8, the above-mentioned steering valve 20, the above-mentioned pilot valve 19, and the pilot pipe 145.

The pilot pipe 145 through which the pilot fluid flows goes from a pilot hydraulic pressure source 151, through the shutoff valve 140, to the pilot valve 19. The pilot pipe 145 also goes from the pilot valve 19 to the steering valve 20.

Also, a steering pipe 153 is provided from a main hydraulic pressure source 152 (such as a hydraulic pump) to the pair of steering cylinders 8.

When the operator operates the joystick 32 when the opening and closing lever 141 is disposed in its open position (indicated by the two-dot chain line in FIG. 21), the pilot valve 19 is actuated on the basis of the operation amount. This movement of the pilot valve 19 causes the pilot fluid to flow past the shutoff valve 140 and to the steering valve 20. The steering valve 20 is actuated by the pilot fluid, and the steering fluid causes the pair of steering cylinders 8 to expand and contract. This expansion and contraction performs an articulated operation of the front frame 11 with respect to the rear frame 12, and provides steering.

On the other hand, even if the joystick 32 is operated when the opening and closing lever 141 is in its closed position (indicated by a solid line in FIG. 20), since the flow of pilot fluid is blocked by the shutoff valve 140, the pilot fluid pressure does not reach the steering valve 20. Accordingly, the steering valve 20 is not actuated, and there is no steering operation.

Figure 22:
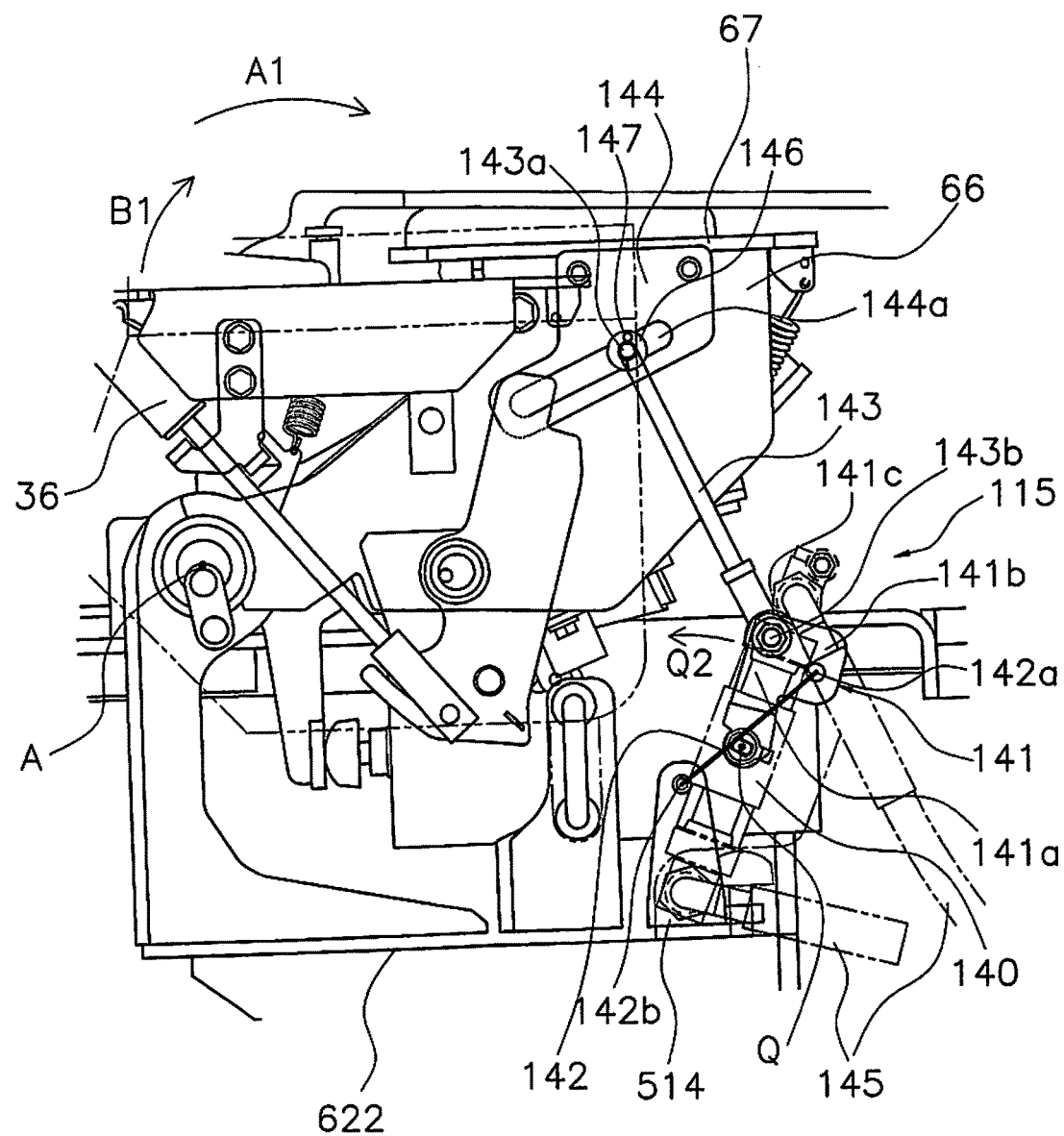
FIG. 22 is a side view of the area near the steering lock mechanism in FIG. 19 in which the console box 31 is disposed in an operation position.

FIG. 22 is a left side view of the area near the steering lock mechanism 115 in FIG. 19. In FIG. 22, for the sake of illustration, the shutoff valve 140 is indicated by a two-dot chain line, while the configuration on the right side of the shutoff valve 140 (the rear side when the drawing is viewed) is indicated by a solid line.

As shown in FIG. 22, the opening and closing lever 141 is substantially L shaped in side view, and has a lever main body 141a and a spring linking component 141b that is formed substantially perpendicular to the lever main body 141a. The lever main body 141a is provided rotatably with respect to the shutoff valve 140. The link rod 143 is rotatably linked to the distal end 141c of the lever main body 141a.

In the state shown in FIG. 22, in which the console box 31 is disposed in the operation position P1, the lever main body 141a is disposed facing upward from the shaft Q along the shutoff valve 140, and the spring linking component 141b is formed facing rearward from the lever main body 141a.

b. Spring Member

A first end 142a of the spring member 142 is linked to the spring linking component 141b. As shown in FIGS. 20 and 22, a second end 142b of the spring member 142 is fixed to a bracket 514 provided rising up from the bottom face 622. In FIG. 22, the spring member 142 is drawn with a thick line for clarity of the drawing. As shown in FIG. 22, a line connecting the first end 142a and second end 142b of the spring member 142 is located higher than the rotary shaft Q of the opening and closing lever 141, so in a state in which the console box 31 is located in the operation position P1, the opening and closing lever 141 is biased to the side where the shutoff valve 140 is in an open state (arrow Q2).

c. Link Rod

The first end 143a of the link rod 143 is slidably attached to the slot 144a.

The slot formation component 144 in which the slot 144a is formed will now be described. The above-mentioned slot formation component 144 is in the form of a thin plate, and as shown in FIG. 22, the slot formation component 144 is fixed to the third rotary part 67 of the rotary frame 52. The linear slot 144a is formed in the slot formation component 144. The slot 144a is formed obliquely so that its front end is located lower than its rear end in a state in which the console box 31 is in the operation position P1.

The first end 143a of the link rod 143 is bent to the left (the front side when viewed in FIG. 22) and inserted into the slot 144a. Two washers are provided to the first end 143a inserted into the slot 144a, so as to sandwich the slot formation component 144. In FIG. 22, only the front washer 146 is shown. Furthermore, a cotter pin 147 for the washer 146 is provided to the first end 143a in front of the washer 146.

Thus, the first end 143a of the link rod 143 is configured to be capable of sliding within the slot 144a.

Also, the second end 143b of the link rod 143 is rotatably linked to the distal end 141c of the lever main body 141a of the opening and closing lever 141.

2. Rotary Operation

Next, the operation of the steering lock mechanism 115 along with the rotary operation of the console box 31 will be described through reference to FIG. 19 and FIGS. 22 to 27.

2-1. Rotation from Retracted Position to Operation Position

When the rotary lever 36 is rotated rearward from a state in which the console box 31 shown in FIG. 19 is in the operation position P1, the rotary frame 52 rotates rearward around the rotary shaft A (the arrow A1 direction). Along with this rotation of the rotary frame 52, the slot formation component 144 also rotates around the rotary shaft A.

Figure 23:
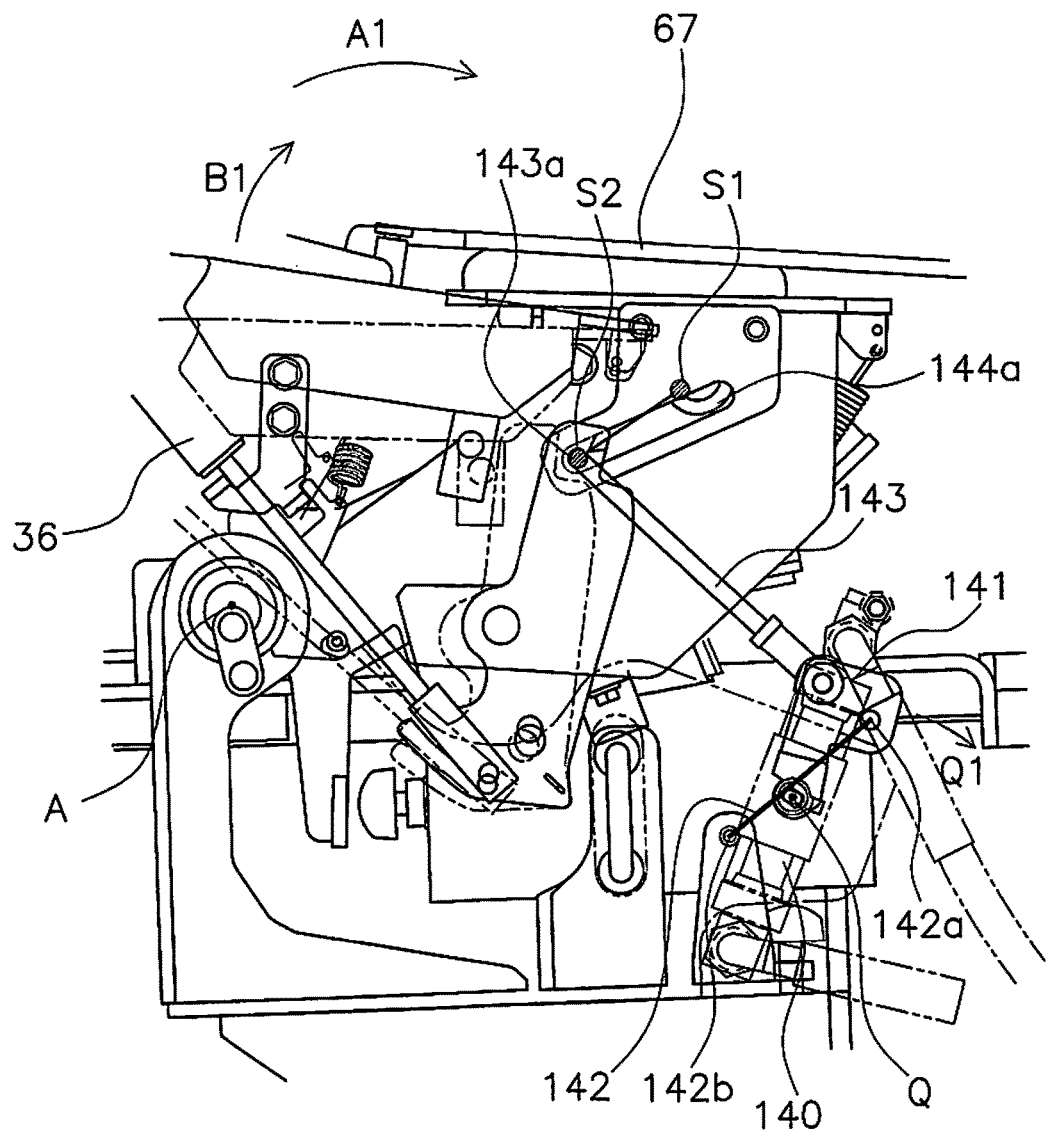
FIG. 23 is a side view illustrating the operation of the steering lock mechanism in FIG. 22 in which a tilt angle of the console box is approximately three degrees.

FIG. 23 shows the state when the rotary lever 36 has been rotated rearward (the arrow B1 direction) from FIG. 22, and the tilt angle of the console box 31 is approximately 3 degrees. The tilt angle here indicates the state when the console box 31 has rotated approximately 3 degrees rearward from the operation position P1, and examples of the tilt angle in the various states are given below.

FIG. 23 shows part of the configuration in the state in FIG. 22, indicated by a two-dot chain line. The position of the first end 143a in FIG. 22 is labeled S1.

When the console box 31 is rotated approximately 3 degrees from the state in FIG. 22, the first end 143a slides through the slot 144a to the front end (see the positions S1 and S2). Since the opening and closing lever 141 is biased forward by the spring member 142 (the arrow Q2 direction in FIG. 22), the first end 143a can move smoothly. In this state, since the opening and closing lever 141 is not rotating, the shutoff valve 140 is open. The state of the opening and closing lever 141 when the console box 31 is disposed in the operation position P1 shall be termed zero degrees.

Figure 24:
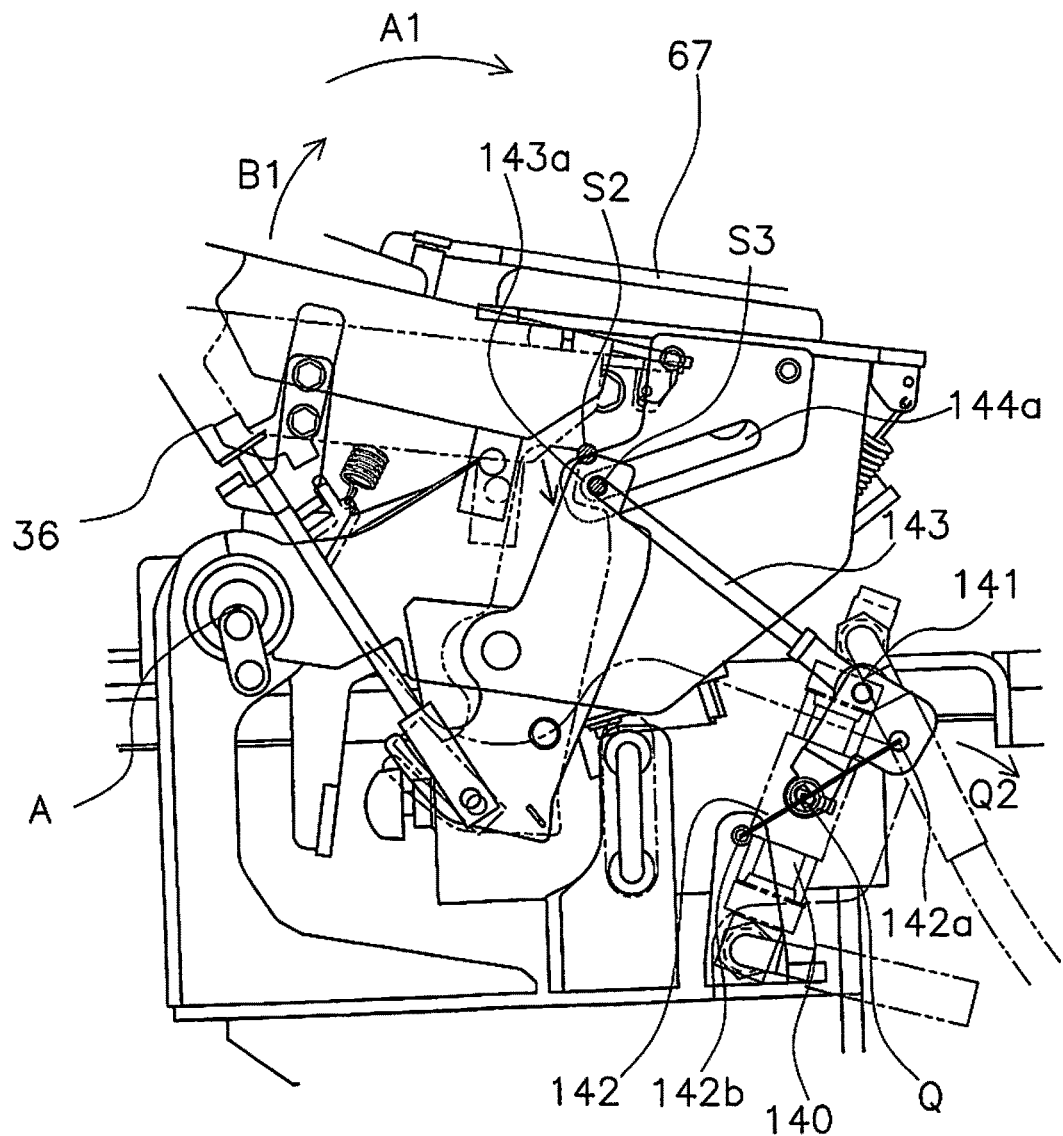
FIG. 24 is a side view illustrating the operation of the steering lock mechanism in FIG. 22 in which a tilt angle of the console box is approximately eight degrees and a rotational angle of an opening and closing lever is approximately 15 degrees.

FIG. 24 shows the state when the rotary lever 36 is grasped and rotated another approximately 5 degrees rearward (the arrow A1 direction) from the state in FIG. 23. The position of the first end 143a in the state in FIG. 24 (when the tilt angle is approximately 8 degrees) is labeled S3, and the position of the first end 143a in FIG. 23 is labeled S2.

In the state in FIG. 23, since the first end 143a is disposed at the front end of the slot 144a, as shown in FIG. 24, the slot formation component 144 also rotates along with the rotation of the rotary frame 52, and the link rod 143 is pushed rearward by the slot formation component 144. This rearward movement of the link rod 143 rotates the opening and closing lever 141 rearward (the arrow Q2 direction) around the shaft Q. This rotation causes the shutoff valve 140 to block the flow passage of the pilot fluid just a little. Thus, the first end 143a does not move through the slot 144a, and the link rod 143 moves rearward along with the rotation of the slot formation component 144. In the state shown in FIG. 24, the rotational angle of the opening and closing lever 141 is approximately 15 degrees.

Figure 25:
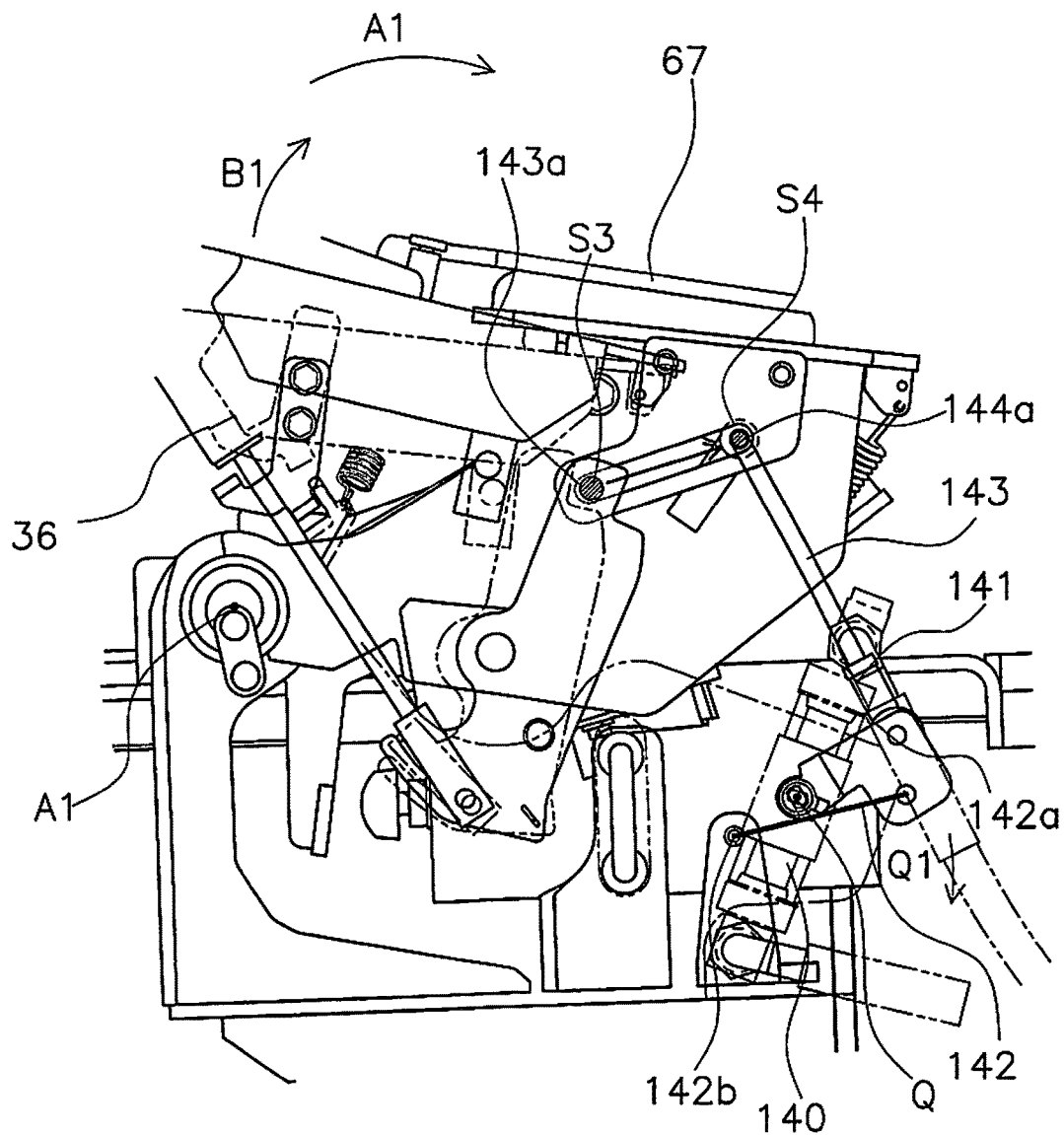
FIG. 25 is a side view illustrating the operation of the steering lock mechanism in FIG. 22 in which a tilt angle of the console box is approximately eight degrees and a rotational angle of an opening and closing lever is approximately 45 degrees.

At this point, since a line connecting the first end 142a and the second end 142b of the spring member 142 is moving lower than the rotary shaft Q of the opening and closing lever 141, the biasing force of the spring member 142 acts to rotate the opening and closing lever 141 rearward (the arrow Q1 direction). As shown in FIG. 25, the biasing force of the spring member 142 causes to the opening and closing lever 141 rotates rearward, and the link rod 143 also is pulled by the opening and closing lever 141. Therefore, when the first end 143a of the link rod 143 moves rearward through the slot 144a, and the first end 143a reaches the rear end of the slot 144a, the rearward rotation of the opening and closing lever 141 also stops. The rotational angle of the opening and closing lever 141 at this point is approximately 45 degrees. FIG. 25 shows the position S3 of the first end 143a in the state in FIG. 24, and the position S4 of the first end 143a in the state in FIG. 25. In the states in FIGS. 24 and 25, the tilt angle of the console box 31 is the same.

Figure 26:
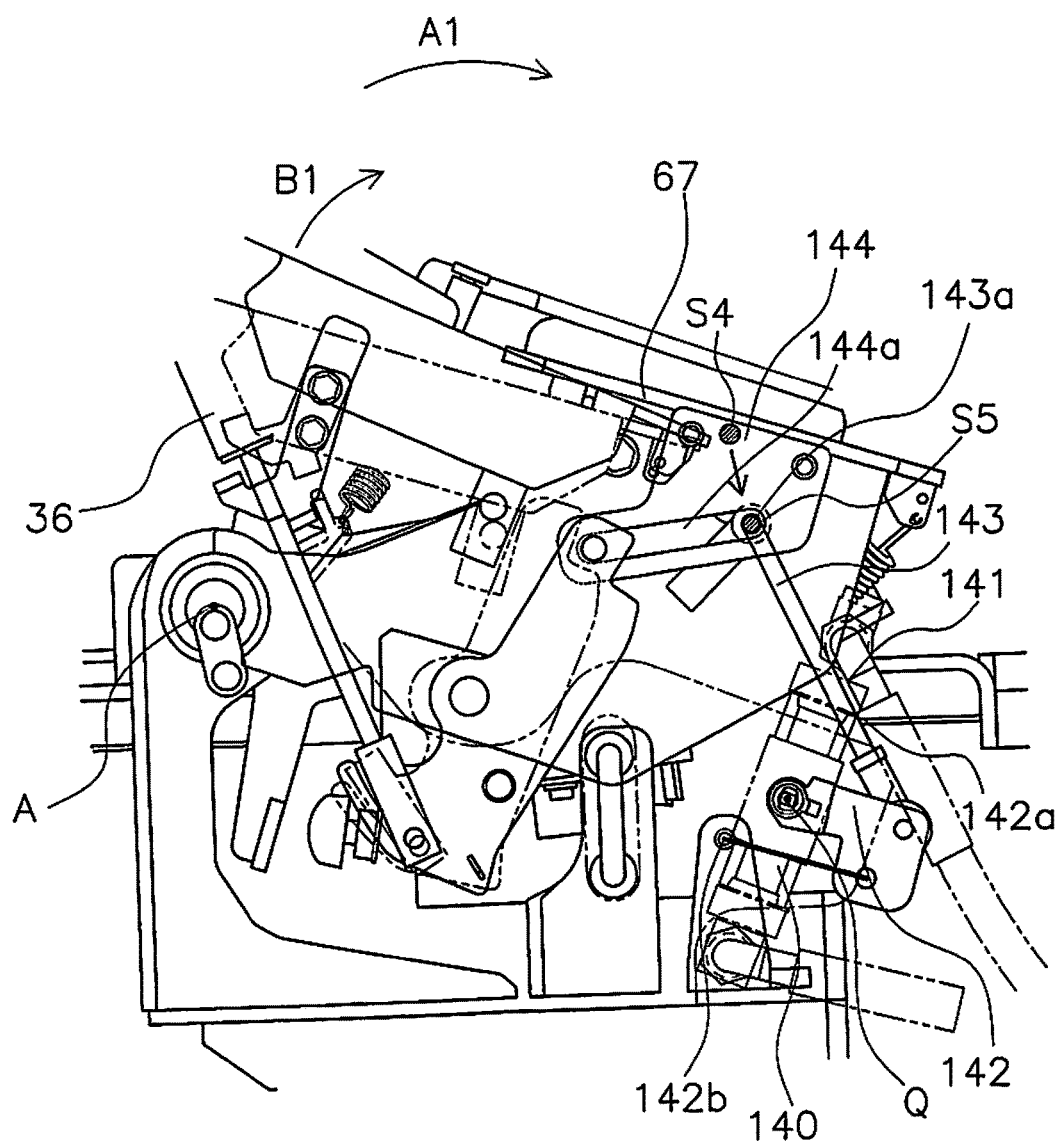
FIG. 26 is a side view illustrating the operation of the steering lock mechanism in FIG. 22 in which a tilt angle of the console box is approximately eighteen degrees.

FIG. 26 shows the state when the console box 31 is rotated from the state in FIG. 25 about another 10 degrees rearward (the arrow A1 direction) (tilt angle of approximately 18 degrees). In FIG. 26, the position of the first end 143a in the state in FIG. 26 is labeled S5, and the position of the first end 143a in FIG. 25 is labeled S4.

In the state in FIG. 25, the first end 143a is disposed at the rear end of the slot 144a, so as shown in FIG. 26, the slot formation component 144 also rotates along with the rotary frame 52, and the link rod 143 is pushed obliquely downward by the slot formation component 144. This rearward movement of the link rod 143 rotates the opening and closing lever 141 rearward (the arrow Q1 direction) around the shaft Q. This rotation results in a rotational angle of the opening and closing lever 141 of approximately 90 degrees, and the supply of pilot fluid is completely blocked off by the shutoff valve 140. Accordingly, the steering is locked. Although not depicted in the drawings, the opening and closing lever 141 stops when it hits a protrusion provided to the shutoff valve 140 at a position of approximately 90 degrees.

Furthermore, when the rotary lever 36 is rotated rearward and the console box 31 is rotated, the center of gravity H shown in FIGS. 13A-13C and 14A-14C moves rearward past a vertical line J that passes through the rotary shaft A, with the tilt angle at approximately 23 degrees, and the console box 31 rotates under its own weight to the retracted position P2.

Figure 27:
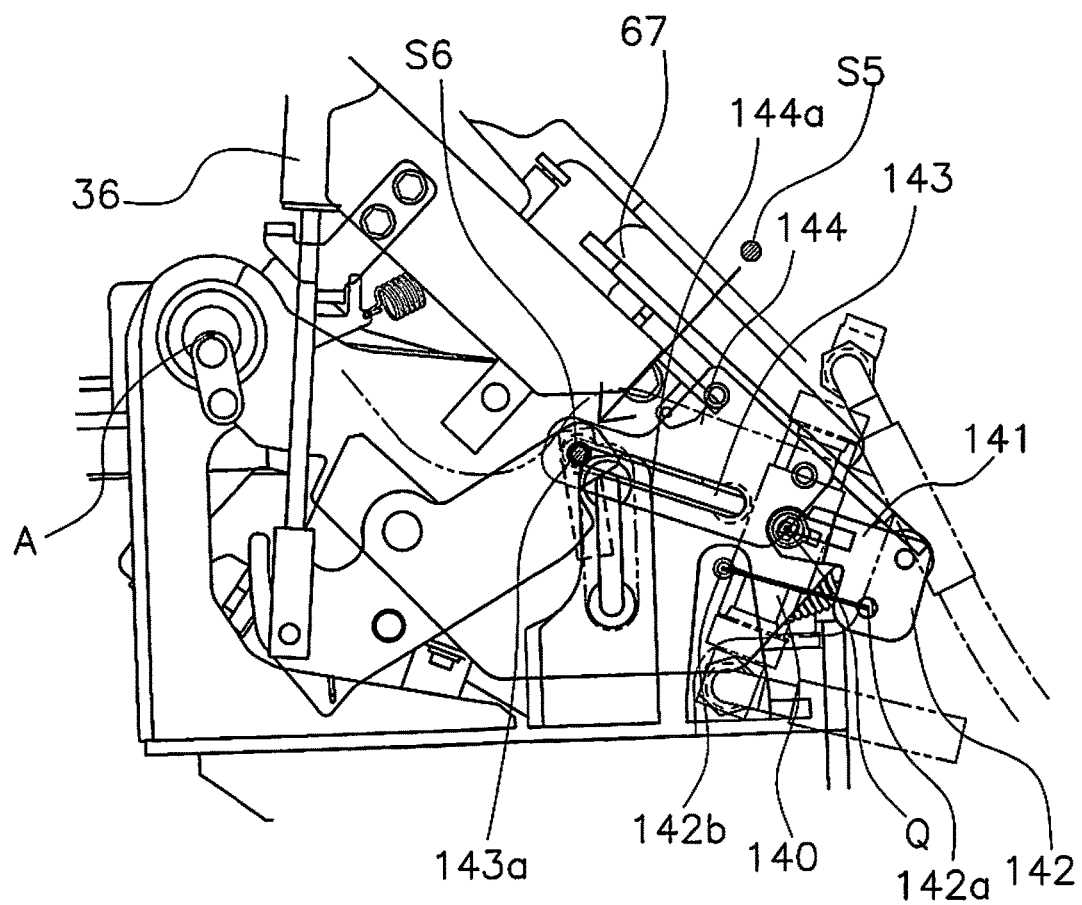
FIG. 27 is a side view illustrating the operation of the steering lock mechanism in FIG. 22 in which the console box is disposed in a retracted position.

FIG. 27 shows the state when the console box 31 is disposed in the retracted position P2. In FIG. 27, S5 is the position of the first end 143a in the state in FIG. 26, and S6 is the position of the first end 143a in the state in FIG. 27.

As shown in FIGS. 25 and 26, the opening and closing lever 141 cannot rotate more than a rotational angle of 90 degrees, so the second end 143b of the link rod 143 cannot move rearward. Accordingly, when the first end 143a of the link rod 143 moves forward through the slot 144a, and the rotation of the console box 31 is stopped by the retracted position stopper 112, the movement of the first end 143a also comes to a stop.

As discussed above, the steering is locked by the shutoff valve 140 before the center of gravity H rotates past the rotary shaft A to the rear and toward the retracted position P2. Therefore, the steering is locked before the joystick 32 moves close to the operator.

Also, the spring member 142 straddles the rotary shaft Q as mentioned above as the console box 31 rotates. In other words, the rotary shaft Q of the opening and closing lever 141 is disposed so as to be included in the rotational range of the spring member 142 around the second end 142b.

2-2. Rotary Operation from Retracted Position to Operation Position

When the operator rotates the rotary lever 36 forward from a state in which the console box 31 is disposed in the retracted position P2, once the center of gravity H of the console box 31 (see FIGS. 13A-13C and 14A-14C) goes past the vertical line J, the console box 31 starts rotating forward under its own weight. Along with the rotation of the console box 31, the first end 143a of the link rod 143 moves through the slot 144a, and the opening and closing lever 141 also rotates forward (the arrow Q2 direction). The rotational angle of the opening and closing lever 141 then reaches zero degrees, and the shutoff valve 140 enters an open state. Consequently, the pilot fluid is able to flow and the steering is unlocked. By the time the center of gravity H of the console box 31 passes to the front side of the rotary shalt A, the rotational angle of the opening and closing lever 141 is approximately 15 degrees, and the shutoff valve 140 is able to supply a small amount of pilot fluid, but is not yet in a completely open state.

Although not depicted in the drawings, when the opening and closing lever 141 rotates forward and its rotational angle reaches zero degrees, it is stopped by a protrusion provided to the shutoff valve 140.

As shown in FIG. 19, the wheel loader 1 (an example of a work vehicle) in this exemplary embodiment comprises the console box 31, the link rod 143, and the shutoff valve 140. The console box 31 is disposed on the side of the operator's seat 30, is able to rotate in the forward and backward direction between the operation position P1 that is disposed horizontally and the retracted position P2 that is rotated rearward from the operation position P1, and has the slot 144a (an example of a slot). The link rod 143 is connected at one end to the slot 144a and transmits the rotation of the console box 31. The shutoff valve 140 is capable of rotating the shaft Q (an example of an opening and closing shaft) to switch between an open position at which the actuator drive-use hydraulic circuit 200 can be actuated, and a closed position at which the actuator drive-use hydraulic circuit 200 cannot be actuated. The second end 143b (an example of the other end) of the link rod 143 is linked to the shaft Q.

Here, as the console box 31 rotates rearward, the fluid that controls the steering cylinders 8 is blocked, so that the steering cylinders 8 (an example of a hydraulic actuator) are locked.

Thus, enough space for leaving the seat can be ensured by rotating the console box 31 to the rear, and the steering cylinders 8 can be locked, with both of these being accomplished with a single operation, so less work is entailed when the operator leaves his seat.

As the console box 31 rotates, the link rod 143 slides along the slot 144a, rotating the shaft Q and putting the shutoff valve 140 in its closed position. Thus, the shutoff valve 140 is put in a blocked state when the console box 31 is rotated by a mechanical link, so the locking of the steering cylinders 8 is accomplished easily.

The wheel loader 1 (an example of a work vehicle) in this exemplary embodiment further comprises the opening and closing lever 141 (an example of a lever member). The opening and closing lever 141 is attached to the shaft Q. The second end 143b of the link rod 143 is rotatably connected to the opening and closing lever 141.

Consequently, as the console box 31 rotates, the link rod 143 slides through the slot 144a, and the console box 31 is rotated and rotates the shaft Q, putting the shutoff valve 140 in the closed position.

While the link rod 143 is sliding through the slot 144a, the opening and closing lever 141 is not pushed, and when the first end 143a is disposed at the end of the slot 144a, the link rod 143 pushes the opening and closing lever 141 along with the rotation of the console box 31. Thus, even when the console box 31 is rotated, the opening and closing lever 141 does not move while the link rod 143 is moving through the slot 144a, and the range over which the opening and closing lever 141 rotates in the rotational range of the console box 31 is narrowed. In other words, the rotation of the console box 31 and the rotation of the opening and closing lever 141 do not correspond on a one-to-one basis. Therefore, the shutoff valve 140 spends as little time as possible between the blocked state and the opened state, switching between the two states can be carried out quickly, and the locked and unlocked states of the steering cylinders 8 can be clearly distinguished.

With the wheel loader 1 (an example of a work vehicle) in this exemplary embodiment, the slot 144a is formed in a linear shape a shown in FIG. 22.

Thus, forming the slot 144a in a linear shape reduces wear more than when it is formed in a curved shape.

As shown in FIG. 25, the wheel loader 1 (an example of a work vehicle) in this exemplary embodiment further comprises the spring member 142. The spring member 142 links the opening and closing lever 141 to the floor of the operator's seat 30. The first end 142a of the spring member 142 linked to the opening and closing lever 141 is disposed more to the rear than the shaft Q of the opening and closing lever 141. The second end 142b of the spring member 142 linked to the floor 5a is disposed more to the front than the shaft Q. The shaft Q is disposed, in side view, within the rotational range of the spring member 142 whose fulcrum is the second end 142b as the opening and closing lever 141 rotates.

The biasing force of this spring member 142 allows the first end 143a of the link rod 143 to move rapidly within the slot. Also, the opening and closing lever 141 is biased to the open side until the spring member 142 rotates from the front and goes past the shaft Q, and the opening and closing lever 141 is biased to the blocked side once the shaft Q has been passed.

Therefore, the shutoff valve 140 spends as little time as possible between the blocked state and the opened state, switching between the two states can be carried out quickly, and the locked and unlocked states of the steering cylinders 8 can be clearly distinguished.

The above-mentioned "second end 142b of the spring member 142 linked to the floor 5a" encompasses a situation in which the second end 142b of the spring member is linked directly or indirectly to the floor 5a. In this exemplary embodiment, the second end 142b of the spring member 142 is fixed to the bracket 514 installed above the bottom face 622 of the fixed component 62 connected to the lower frame 30c of the operator's seat 30 that is fixed to the floor 5a.

As shown in FIG. 4, with the wheel loader 1 (an example of a work vehicle) in this exemplary embodiment, the shutoff valve 140 is provided higher than the floor 5a of the operator's seat 30.

Thus, providing the shutoff valve 140 higher than the floor 5a makes assembly of the cab 5 easier than when the shutoff valve 140 is provided lower than the floor.

With the wheel loader 1 (an example of a work vehicle) in this exemplary embodiment, the actuator drive-use hydraulic circuit 200 has the steering cylinders 8 (an example of a hydraulic actuator), the steering valve 20 (an example of a steering control valve), the pilot valve 19, and the pilot pipe 145. The steering cylinders 8 change the steering angle of the wheel loader 1 (an example of a work vehicle). The steering valve 20 supplies hydraulic fluid to the steering cylinders 8. The pilot valve 19 supplies pilot fluid to the steering valve 20. The pilot pipe 145 connects the steering valve 20 to the pilot valve 19. The shutoff valve 140 is installed along the pilot pipe 145.

Thus, blocking off the pilot fluid causes the steering valve 20 not to operate, so the steering cylinders 8 are not driven and the steering is locked.

An exemplary embodiment of the present invention is described above, but the present invention is not limited to or by the above exemplary embodiment, and various modifications are possible without departing from the gist of the invention.

The gas spring 110 is provided in the above embodiment, but the gas spring 110 need not be provided. Here again, as shown in FIGS. 13A-13C and 14A-14C, the center of gravity H of the console box 31 is disposed more to the front than the rotary shaft A in the operation position P1, and is disposed more to the rear than the rotary shaft A in the retracted position P2, so the console box 31 can be stably disposed in the operation position P1 and the retracted position P2.

In the above exemplary embodiment, the spring member 142 is provided to bias the opening and closing lever 141 forward (the arrow Q2 direction) or rearward (the arrow Q1 direction), but the spring member 142 need not be provided. Here again, the link rod 143 is pushed by the slot formation component 144 during rotation in the forward and backward direction, thereby rotating the opening and closing lever 141 in the forward and backward direction.

Consequently, even when the spring member 142 should cease functioning due to age or the like, when the console box 31 is rotated rearward, the steering can still be locked and stability increased.

With the wheel loader 1 in the above exemplary embodiment, the joystick 32 of the console box 31 is given as an example of an operation member, but this is not limited to being the joystick 32. Furthermore, an operation member itself need not be provided, and the configuration of this exemplary embodiment can be applied so long as the console box 31 is provided to the side of the operator's seat 30.

With the wheel loader 1 in the above exemplary embodiment, the link 33 is provided, and the operation of the joystick 32 is transmitted mechanically to the pilot valve 19, but the configuration may be such that no link 33 is provided, and the operation is transmitted electrically. In this case, the transmission may be done by wire or wirelessly.

With the wheel loader 1 in the above exemplary embodiment, the pilot valve 19 is provided as an example of a control valve, but this is not limited to the pilot valve 19. For example, the pilot valve 19 may not be provided, the link 33 may be connected to the steering valve 20 (an example of a control valve), and the steering valve 20 may be operated directly with the joystick 32.

In the above exemplary embodiment, the armrest 34 is provided on the upper side of the console box 31, but the armrest 34 need not be provided. Also, as shown in FIGS. 9 and 10, the rear end of the armrest 34 protrudes rearward from the rear end 31b of the console box 31, but the armrest 34 may be formed so that there is no protrusion.

In the above exemplary embodiment, a wheel loader is used as an example of a work vehicle, but this may instead be a dump truck, a hydraulic excavator, or the like.

In the above exemplary embodiment, the steering wheel 37 is disposed in the cab 5, but depending on the work vehicle, the steering wheel 37 is sometimes not provided.

In the above exemplary embodiment, as an example of indirectly attaching the second end 142b of the spring member 142 to the floor 5a, the second end 142b of the spring member 142 is fixed to the bracket 514 installed above the bottom face 622 of the fixed component 62 connected to the lower frame 30c of the operator's seat 30 that is fixed to the floor 5a. However, the second end 142b of the spring member 142 may instead be directly attached to the floor 5a.

The work vehicle pertaining to the present invention has the effect of reducing the amount of work entailed when the operator leaves his seat, and can be broadly applied to various kinds of work vehicles, such as a wheel loader.

The invention claimed is:

1. A work vehicle, comprising:
    a console box disposed on a side of an operator's seat, the console box being rotatable in the forward and backward direction between an operation position in which the console box is disposed horizontally and a retracted position in which the console box is rotated rearward from the operation position, the console box having a slot;
    a link rod connected at one end to the slot and transmitting the rotation of the console box; and
    a shutoff valve capable of rotating an opening and closing shaft to switch between an open position at which an actuator drive-use hydraulic circuit can be actuated, and a closed position at which the actuator drive-use hydraulic circuit cannot be actuated,
    the other end of the link rod being linked to the opening and closing shaft.

2. The work vehicle according to claim 1, further comprising
    a lever member attached to the opening and closing shaft, the other end of the link rod being rotatably connected to the lever member.

3. The work vehicle according to claim 1, wherein the slot is formed in a linear shape.

4. The work vehicle according to claim 2, further comprising
    a spring member linking the lever member to a floor of the operator's seat,
    a first end of the spring member linked to the lever member being disposed more to the rear than the opening and closing shaft of the lever member,
    a second end of the spring member linked to the floor is being disposed more to the front than the opening and closing shaft, and
    the opening and closing shaft being disposed, in side view, within a rotational range of the spring member as the lever member rotates, the second end being a fulcrum of the spring member.

5. The work vehicle according to claim 3, wherein the shutoff valve is provided higher than a floor of the operator's seat.

6. The work vehicle according to claim 1, wherein the actuator drive-use hydraulic circuit includes
    a hydraulic actuator configured to change the steering angle of the work vehicle;
    a steering control valve configured to supply hydraulic fluid to the hydraulic actuator;
    a pilot valve configured to supply pilot fluid to the steering control valve; and
    a pilot pipe connecting the steering control valve to the pilot valve, the shutoff valve being installed along the pilot pipe.

7. The work vehicle according to claim 2, wherein the slot is formed in a linear shape.

8. The work vehicle according to claim 7, further comprising a spring member linking the lever member to a floor of the operator's seat, a first end of the spring member linked to the lever member being disposed more to the rear than the opening and closing shaft of the lever member, a second end of the spring member linked to the floor being disposed more to the front than the opening and closing shaft, and the opening and closing shaft being disposed, in side view, within a rotational range of the spring member as the lever member rotates, the second end being a fulcrum of the spring member.

9. The work vehicle according to claim 2, wherein the actuator drive-use hydraulic circuit includes a hydraulic actuator configured to change the steering angle of the work vehicle;

a steering control valve configured to supply hydraulic fluid to the hydraulic actuator;

a pilot valve configured to supply pilot fluid to the steering control valve; and a pilot pipe connecting the steering control valve to the pilot valve, the shutoff valve being installed along the pilot pipe.

10. The work vehicle according to claim 3, wherein the actuator drive-use hydraulic circuit includes a hydraulic actuator configured to change the steering angle of the work vehicle;

a steering control valve configured to supply hydraulic fluid to the hydraulic actuator;

a pilot valve configured to supply pilot fluid to the steering control valve; and a pilot pipe connecting the steering control valve to the pilot valve, the shutoff valve being installed along the pilot pipe.

11. The work vehicle according to claim 4, wherein the actuator drive-use hydraulic circuit includes a hydraulic actuator configured to change the steering angle of the work vehicle;

a steering control valve configured to supply hydraulic fluid to the hydraulic actuator;

a pilot valve configured to supply pilot fluid to the steering control valve; and a pilot pipe connecting the steering control valve to the pilot valve, the shutoff valve being installed along the pilot pipe.

12. The work vehicle according to claim 5, wherein the actuator drive-use hydraulic circuit includes a hydraulic actuator configured to change the steering angle of the work vehicle;

a steering control valve configured to supply hydraulic fluid to the hydraulic actuator;

a pilot valve configured to supply pilot fluid to the steering control valve; and a pilot pipe connecting the steering control valve to the pilot valve, the shutoff valve being installed along the pilot pipe.

13. A work vehicle, comprising:

a console box disposed on a side of an operator's seat, the console box being rotatable between an operation position and a retracted position, the console box having a slot;

a link rod connected at one end to the slot and transmitting the rotation of the console box; and a shutoff valve capable of rotating an opening and closing shaft to switch between an open position at which an actuator drive-use hydraulic circuit can be actuated, and a closed position at which the actuator drive-use hydraulic circuit cannot be actuated, the other end of the link rod being linked to the opening and closing shaft.

* * * * *